US012070433B2

(12) United States Patent
Teng et al.

(10) Patent No.: US 12,070,433 B2
(45) Date of Patent: Aug. 27, 2024

(54) ASSISTIVE DEVICE AND CONTROL METHOD THEREOF

(71) Applicant: FREE BIONICS TAIWAN INC., Hsinchu (TW)

(72) Inventors: Ming-Chang Teng, Hsinchu (TW); Kuan-Chun Sun, Hsinchu County (TW); Yi-Jeng Tsai, Taoyuan (TW)

(73) Assignee: FREE BIONICS TAIWAN INC., Hsinchu (TW)

( * ) Notice: Subject to any disclaimer, the term of this patent is extended or adjusted under 35 U.S.C. 154(b) by 979 days.

(21) Appl. No.: 16/904,562

(22) Filed: Jun. 18, 2020

(65) Prior Publication Data

US 2020/0397641 A1 Dec. 24, 2020

Related U.S. Application Data

(60) Provisional application No. 62/864,282, filed on Jun. 20, 2019.

(51) Int. Cl.
*A61H 1/00* (2006.01)
*A61H 3/00* (2006.01)

(52) U.S. Cl.
CPC ......... *A61H 3/00* (2013.01); *A61H 2003/007* (2013.01); *A61H 2201/1642* (2013.01); *A61H 2201/165* (2013.01); *A61H 2201/5061* (2013.01); *A61H 2205/102* (2013.01); *A61H 2205/108* (2013.01)

(58) Field of Classification Search
CPC ................ A61H 3/00; A61H 2003/007; A61H 2201/1642; A61H 2201/165; A61H 2201/5061; A61H 2205/102; A61H 2205/108; A61H 2201/0192; A61H 2201/164; A61H 2201/1645; A61H 2201/1647; A61H 2201/0107; B25J 9/0006
See application file for complete search history.

(56) References Cited

U.S. PATENT DOCUMENTS

| | | | | |
|---|---|---|---|---|
| 8,142,370 | B2 † | 3/2012 | Weinberg | |
| 9,370,439 | B2 † | 6/2016 | Bédard | |
| 9,682,006 | B2 * | 6/2017 | Goldfarb | A61G 7/1017 |
| 9,687,409 | B2 * | 6/2017 | Teng | A61H 1/024 |
| 9,808,073 | B1 * | 11/2017 | Maxwell | A61H 3/008 |
| 10,390,973 | B2 * | 8/2019 | Tong | A61B 5/112 |

(Continued)

FOREIGN PATENT DOCUMENTS

| | | |
|---|---|---|
| CA | 2 673 915 C † | 6/2016 |
| CA | 2673915 † | 6/2016 |

(Continued)

OTHER PUBLICATIONS

Machine translation of written description and claims for JP2015139665A via espacenet (Year: 2015).*

*Primary Examiner* — Michael R Reid
*Assistant Examiner* — Tyler A Raubenstraw
(74) *Attorney, Agent, or Firm* — WPAT LAW; Anthony King

(57) ABSTRACT

The present disclosure provides an assistive device and a control method thereof. The assistive device is adjustable for fitting different user. The control method of the assistive device is used for aiding user with moving and training.

7 Claims, 32 Drawing Sheets

(56) References Cited

U.S. PATENT DOCUMENTS

| | | | | |
|---|---|---|---|---|
| 10,576,620 | B1 * | 3/2020 | Chou | A61F 5/0102 |
| 2013/0085428 | A1 * | 4/2013 | Deshpande | A61H 9/0092<br>601/148 |
| 2013/0253385 | A1 * | 9/2013 | Goffer | B25J 9/0006<br>601/35 |
| 2014/0142475 | A1 * | 5/2014 | Goldfarb | A61H 1/0262<br>601/35 |
| 2014/0276264 | A1 * | 9/2014 | Caires | B25J 9/0006<br>601/34 |
| 2014/0276265 | A1 * | 9/2014 | Caires | A61H 1/0255<br>601/34 |
| 2014/0358053 | A1 * | 12/2014 | Triolo | B25J 9/0006<br>602/19 |
| 2015/0272810 | A1 * | 10/2015 | Teng | A61H 1/0244<br>601/34 |
| 2016/0113831 | A1 * | 4/2016 | Hollander | A61H 3/00<br>623/32 |
| 2016/0250093 | A1 * | 9/2016 | Koren | A61H 1/0244<br>623/30 |
| 2017/0143574 | A1 * | 5/2017 | Choi | F16M 13/04 |
| 2018/0104075 | A1 * | 4/2018 | Mooney | A61H 3/00 |
| 2018/0110632 | A1 * | 4/2018 | Errico | B25J 9/0006 |
| 2018/0200136 | A1 * | 7/2018 | Yamazaki | A61H 1/024 |
| 2018/0200878 | A1 * | 7/2018 | Tsai | A61F 2/70 |
| 2018/0318164 | A1 * | 11/2018 | Wu | A61H 3/00 |
| 2019/0240103 | A1 * | 8/2019 | Hepler | A61H 3/00 |
| 2019/0254909 | A1 * | 8/2019 | Lee | B25J 9/0006 |
| 2019/0254914 | A1 * | 8/2019 | Nam | A61H 1/0262 |
| 2019/0254915 | A1 * | 8/2019 | Nam | A61H 3/00 |
| 2019/0336383 | A1 * | 11/2019 | Song | A61H 1/024 |
| 2019/0343710 | A1 * | 11/2019 | Lerner | A61H 3/00 |
| 2020/0030179 | A1 * | 1/2020 | Schwenn | A61F 5/0102 |
| 2020/0093625 | A1 * | 3/2020 | Hanft | A61F 5/0111 |
| 2020/0100978 | A1 * | 4/2020 | Moody | A61F 5/0111 |
| 2020/0129367 | A1 * | 4/2020 | Lee | B25J 9/0006 |
| 2020/0179212 | A1 * | 6/2020 | Wilkinson | A61H 1/0285 |
| 2020/0179216 | A1 * | 6/2020 | Choi | A61H 1/024 |

FOREIGN PATENT DOCUMENTS

| | | | | | |
|---|---|---|---|---|---|
| EP | 2 861 198 | B1 | † | 4/2015 | |
| EP | 2861198 | | † | 4/2015 | |
| EP | 1 792 597 | B1 | † | 7/2015 | |
| EP | 1792597 | | † | 7/2015 | |
| EP | 2898861 | A1 | * | 7/2015 | A61F 5/0102 |
| EP | 3539528 | A1 | * | 9/2019 | A61H 1/0237 |
| JP | 2015139665 | A | * | 8/2015 | A61H 1/024 |
| WO | WO-02092164 | A2 | * | 11/2002 | A61H 1/0255 |
| WO | WO-2006118781 | A2 | * | 11/2006 | A61H 1/024 |
| WO | WO-2015153633 | A2 | * | 10/2015 | A61F 5/0102 |
| WO | WO-2017006322 | A2 | * | 1/2017 | A61H 1/0255 |
| WO | 2018/047129 | | † | 3/2018 | |
| WO | WO 2018/047129 | A1 | † | 3/2018 | |
| WO | WO-2018047129 | A1 | * | 3/2018 | A61H 1/024 |
| WO | WO-2018178897 | A1 | * | 10/2018 | A61F 5/01 |
| WO | 2019/164349 | | † | 8/2019 | |
| WO | WO 2019/164349 | A1 | † | 8/2019 | |

* cited by examiner
† cited by third party

ASSISTIVE DEVICE AND CONTROL METHOD THEREOF

PRIORITY CLAIM AND CROSS-REFERENCE

This application claims priority of U.S. provisional application Ser. No. 62/864,282 filed on Jun. 20, 2019, which is incorporated by reference in its entirety.

TECHNICAL FIELD

The present disclosure relates generally to an assistive device and control method thereof, more particularly, to a powered assistive device and control method thereof.

DISCUSSION OF THE BACKGROUND

To aiding the disabled, the elderly persons, the persons who are under a course physical therapy, etc., some equipment are developed for providing assistances.

However, because the conventional assistive equipment is usually customized, to fit the assistive equipment to different users and the control of the assistive equipment may be very inflexible.

SUMMARY

Some embodiments of the present disclosure provide an assistive device. The assistive device includes: a first assembly for fixing the assistive device to thigh of user; a second assembly for fixing the assistive device to shank of user; and a third assembly for connecting the first assembly and the second assembly, and for powering the second assembly. The first assembly includes: a first element having a flexible hook; and a second element having a plurality of slots for receiving the flexible hook, wherein a length the first assembly is adjustable by inserting the flexible hook in different slots.

Some embodiments of the present disclosure provide an assistive device. The assistive device includes: a first assembly; a second assembly; and a third assembly. The first assembly includes: a body used against user; a plug set and a connecting element having a plurality of holes for receiving the plug set. The second assembly is for fixing the assistive device to shank of user. The third assembly is for connecting the connecting element of the first assembly and the second assembly, and for powering the second assembly. A distance between the first assembly and the third assembly is adjustable by inserting the plug set in different holes.

Some embodiments of the present disclosure provide a control method for the above assistive devices. The control method includes: detecting, by a driving unit of the third assembly, an external force from a user; amplifying, by a micro controller unit (MCU) of the assistive device, the external force into an assistive force by a gain; and controlling, by the MCU of the assistive device, the driving unit of the third assembly to provide the assistive force for moving the second assembly.

Some embodiments of the present disclosure provide a control method for the above assistive devices. The control method includes: configuring, by the MCU of the assistive, a driving unit of the assistive device to be operated under a training mode; wherein the training mode includes an isokinetic mode, an isotonic mode or an isometric mode.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

A more complete understanding of the present disclosure may be derived by referring to the detailed description and claims when considered in connection with the Figures, where like reference numbers refer to similar elements throughout the Figures.

FIGS. 2I to 2J illustrate a hinge of a first assembly according to some embodiments of the present disclosure.

DETAILED DESCRIPTION

Figure 1:
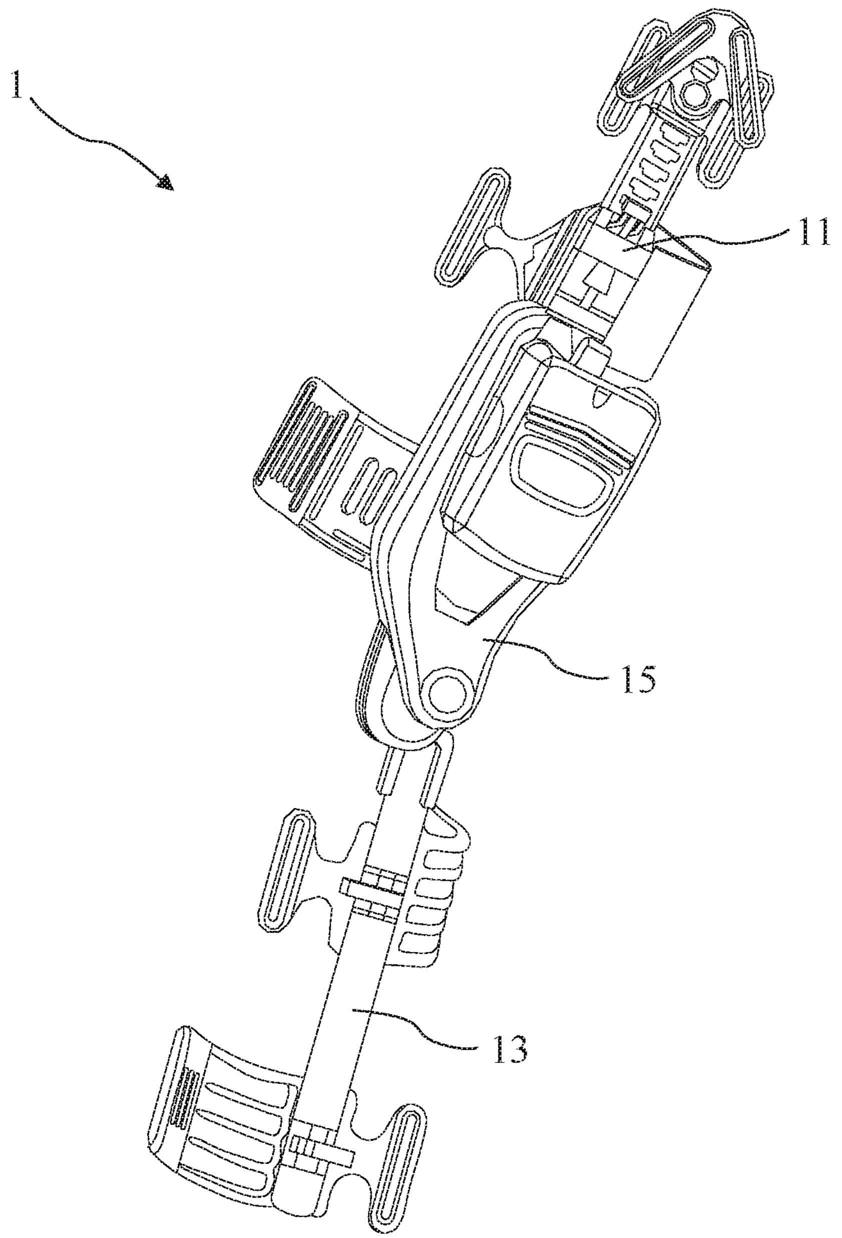
FIG. 1 illustrates an assistive device according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments of the present disclosure are discussed in detail below, it should be appreciated, however, that the present disclosure provides many applicable inventive concepts that can be embodied in a wide variety of specific contexts. The specific embodiments discussed are merely illustrative and do not limit the scope of the disclosure.

Further, spatially relative terms, such as "beneath," "below," "lower," "above," "upper," "lower," "left," "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. It should be understood that when an element is referred to as being "connected to" or "coupled to" another element, it may be directly connected to or coupled to the other element, or intervening elements may be present.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

To aiding the disabled, the elderly persons, the persons who are under a course physical therapy, etc., some equipment are developed for providing assistances. However, because the conventional assistive equipment is usually customized, to fit the assistive equipment to different users may be very inflexible. Accordingly, it is entailed in the art for assistive equipment to be adjustable.

FIG. 1 illustrates an assistive device 1 of some embodiments of the present disclosure. The assistive device 1 includes a first assembly 11, a second assembly 13 and a third assembly 15. In some embodiments, the assistive device 1 may be used for legs. Particularly, the first assembly 11 may be used for fixing the assistive device 1 to thigh of user. The second assembly 13 may be used for fixing the assistive device 1 to shank of user. The third assembly 15 may connect the first assembly 11 and the second assembly 13 and power the second assembly 13 to help user to move (e.g., rotate) shank.

Figure 2A:
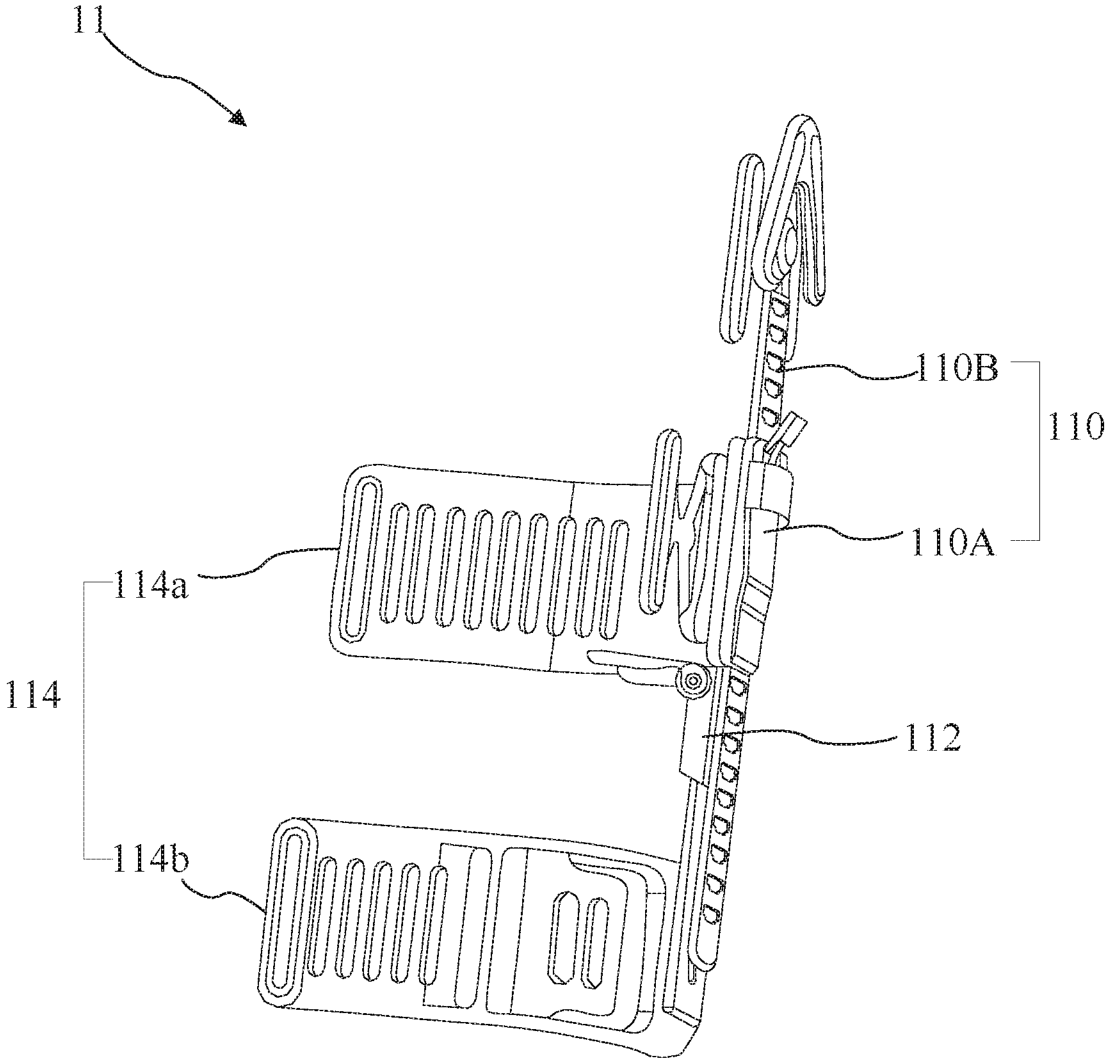
FIG. 2A illustrates a first assembly according to some embodiments of the present disclosure.

Please refer to FIG. 2A which illustrates the first assembly 11 of some embodiments of the present disclosure. In particular, the first assembly 11 may include a length adjustable module 110, a connecting element 112, and a brace set 114 which has a first brace 114*a* and a second brace 114*b*.

In detail, the length adjustable module 110 may be adjusted for fitting a length of the first assembly 11 to a length of thigh of user. The connecting element 112 may be used for connecting the first assembly 11 and the third assembly 15. The brace set 114 may be used to fix the assistive device 1 with thigh of user.

Figure 2B:
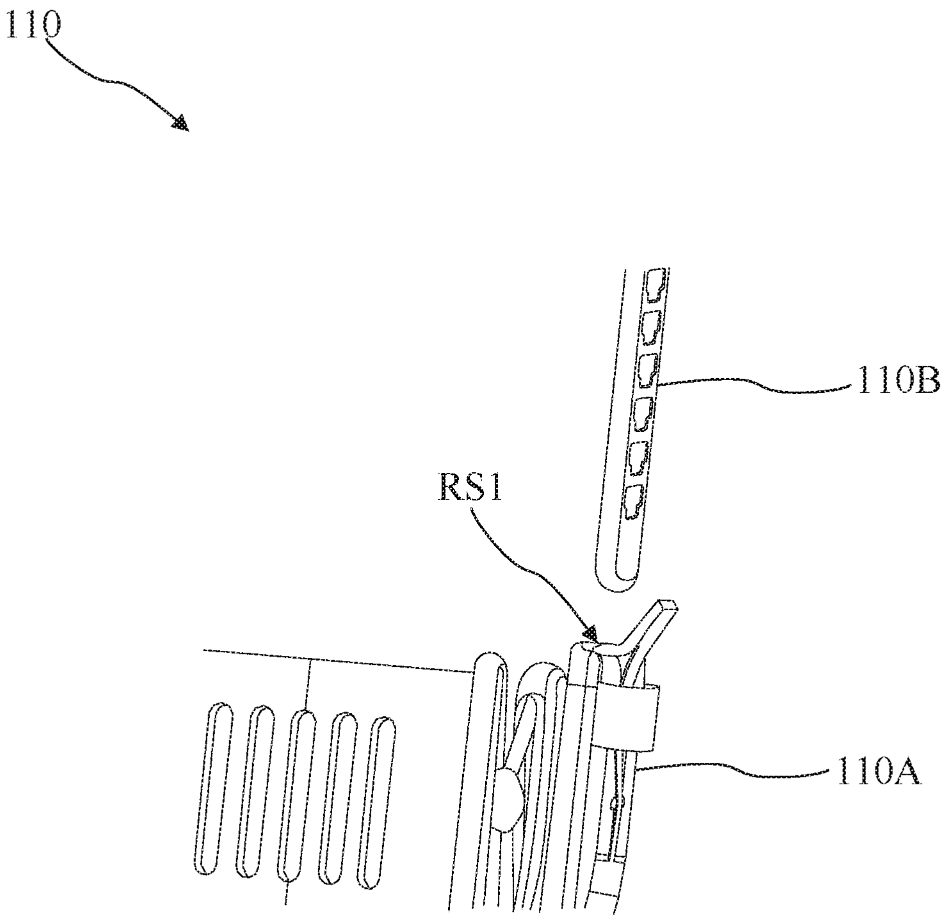
FIGS. 2B to 2C illustrate a length adjustable module according to some embodiments of the present disclosure.
Figure 2C:
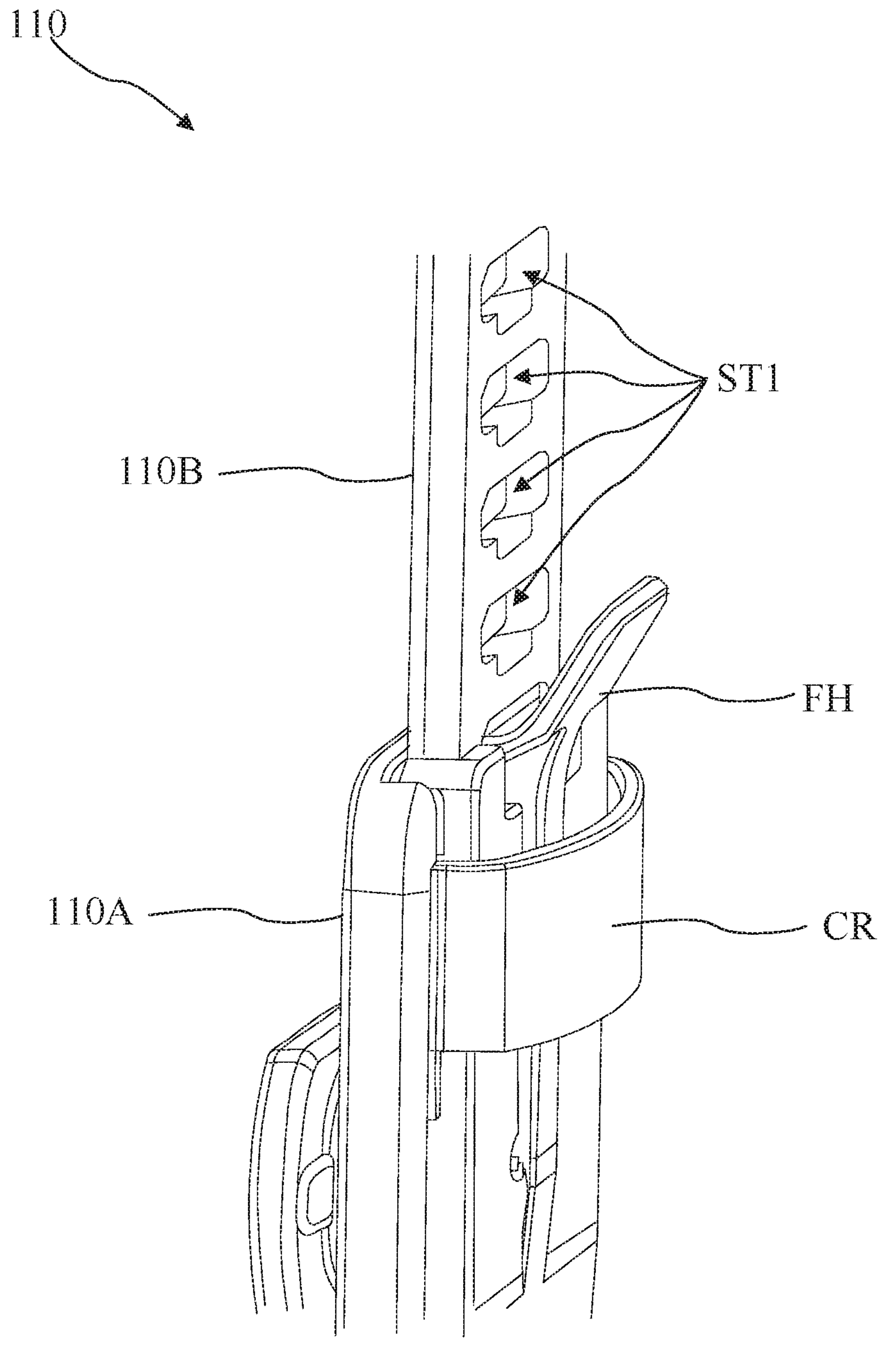
Figure 2D:
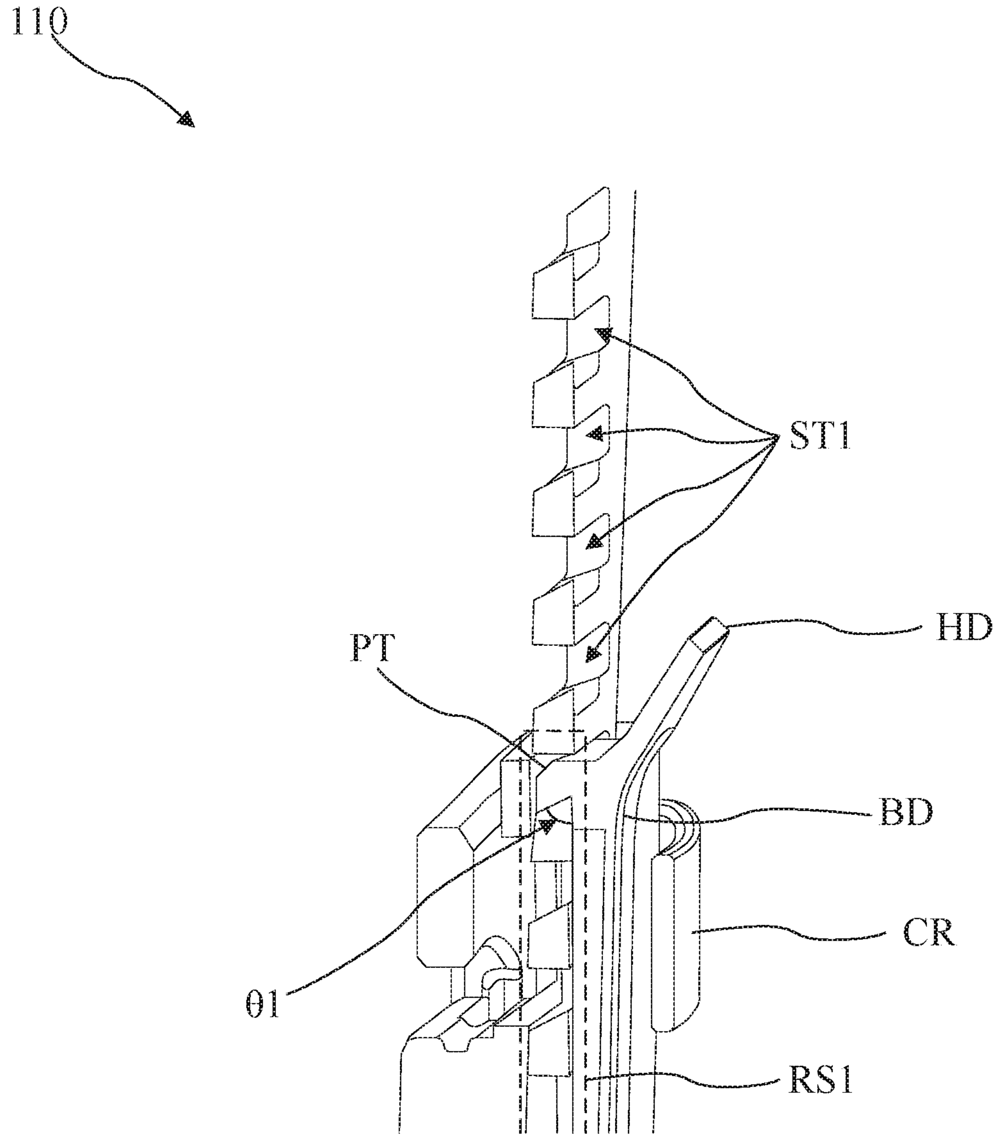
FIG. 2D is a cross-section view of a length adjustable module according to some embodiments of the present disclosure.
Figure 2E:
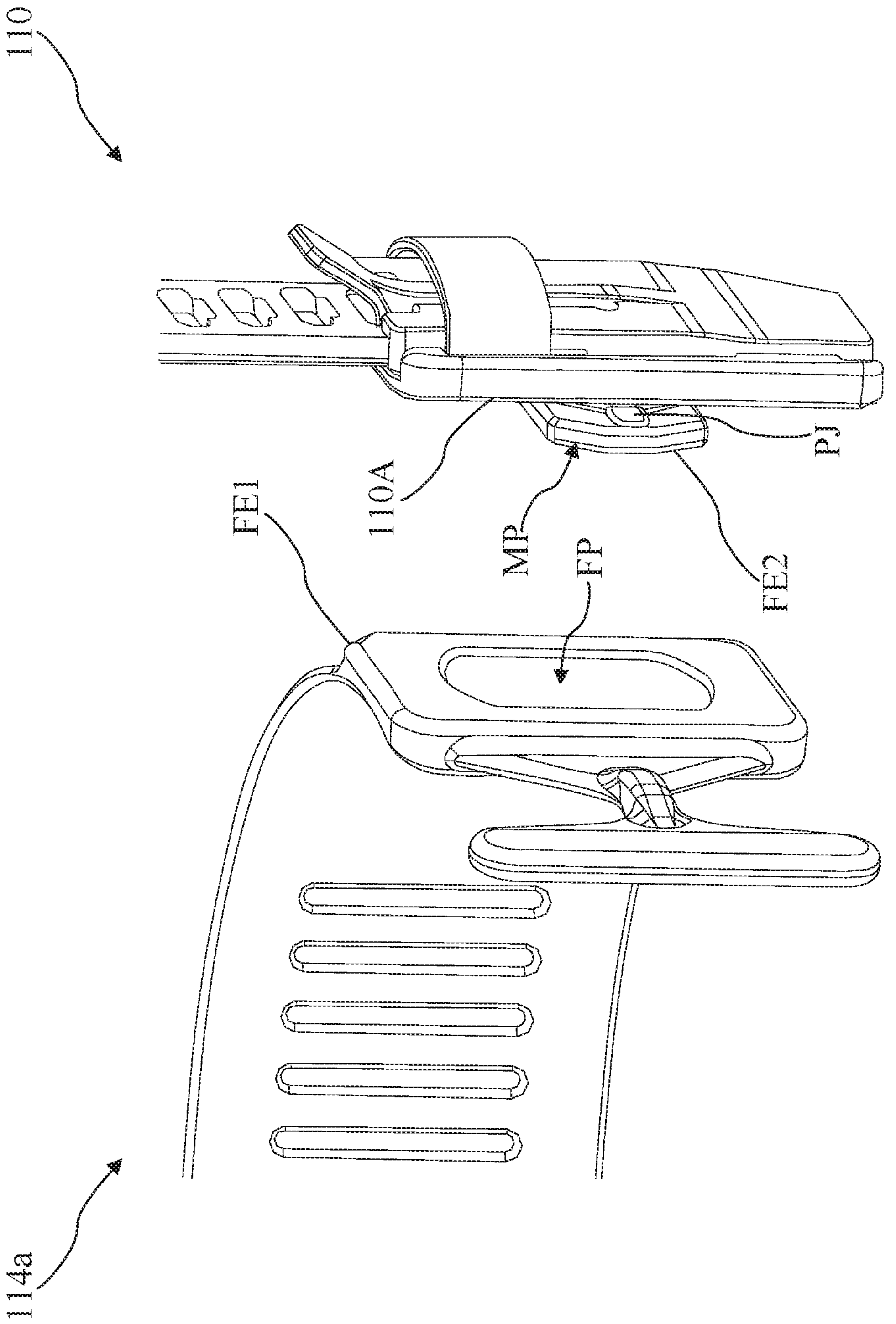
FIGS. 2E to 2H are schematic views of assembling a first brace onto a first element according to some embodiments of the present disclosure.
Figure 2F:
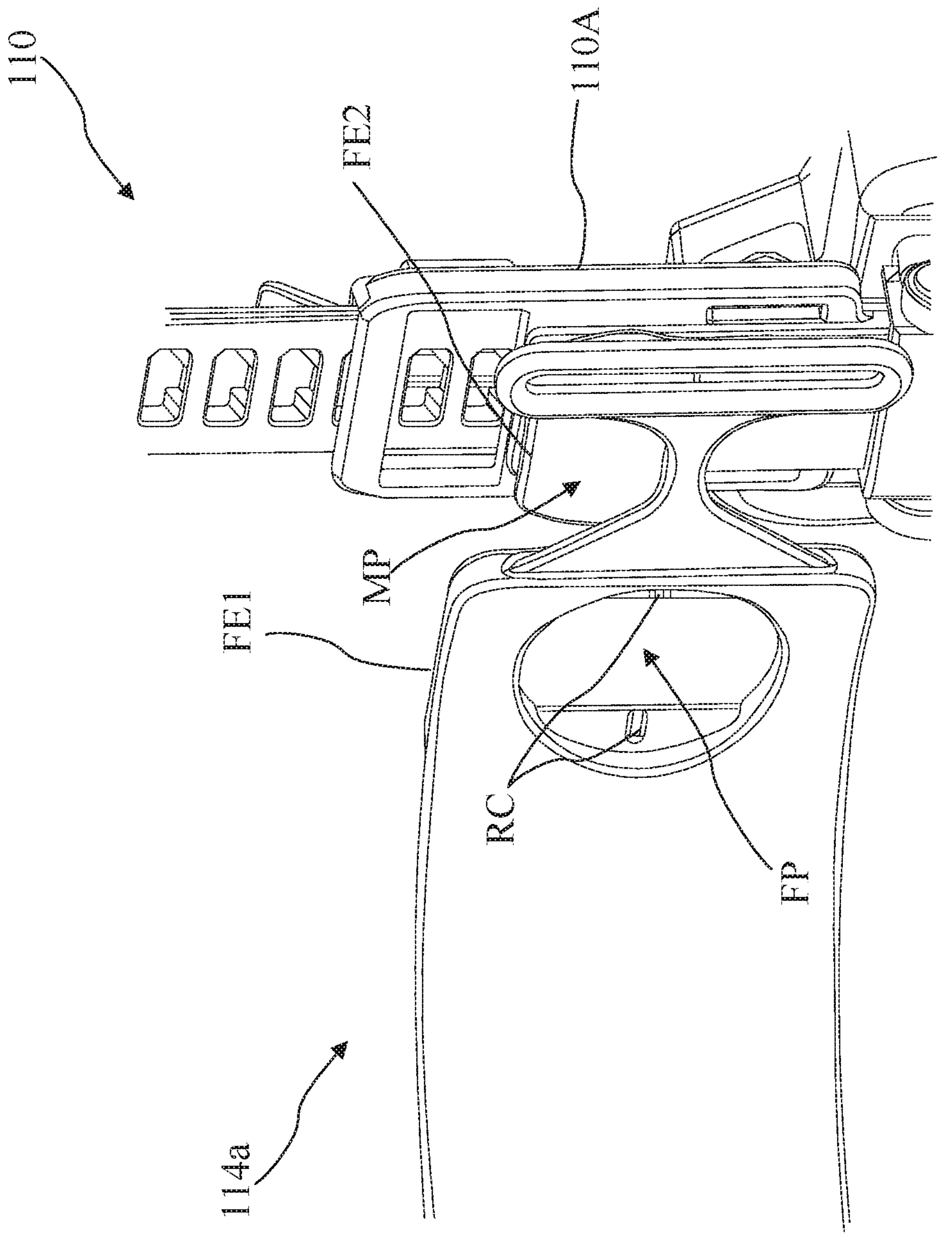

Please refer to FIGS. 2B to 2D. FIGS. 2B to 2C illustrate the length adjustable module 110 of some embodiments of the present disclosure. FIG. 2D is a cross-section view of the length adjustable module 110 of some embodiments of the present disclosure. The length adjustable module 110 may include a first element 110A and a second element 110B.

In detail, the first element 110A may have a flexible hook FH, a receiving space RS1, and a cover CR. The receiving space RS1 may be used for receiving and accommodating the second element 110B. The second element 110B may have a strip shape. A plurality of slots ST1 may be formed on the second element 110B along the strip shape.

The flexible hook FH may have a body BD, a handle HD and a protrusion PT. A shape of the protrusion PT may correspond to a space of each slot ST1. The protrusion PT may be formed at an end of the body BD. The handle HD may be formed adjacent to the protrusion PT. In other words, the handle HD and the protrusion PT may be proximal to a same end of the body BD.

In particular, when the receiving space RS1 receives the second element 110B, the protrusion PT of the flexible hook FH may be inserted into one of the slots ST1 for fixing the second element 110B with the first element 110A. More specifically, in a normal status which is without applying any external force to the flexible hook FH, the position of the protrusion PT of the flexible hook FH may be located in one of the slots ST1 when the receiving space RS1 receives the second element 110B.

In some embodiments, when the user needs to adjust length of the length adjustable module 110, the user may apply force to the handle HD of the flexible hook FH for bending the body BD so that the protrusion PT may be pulled out of the corresponding slot ST1. Then, the user may slide the second element 110B along the receiving space RS1 of the first element 110A. The cover CR may be used for containing the bend of the body BD within a range.

When the length adjustable module 110 is adjusted to a required length by sliding the second element 110B along the receiving space RS1, the user may stop applying force to the handle HD of the flexible hook FH so that the body BD may be recovered as the mentioned normal status. Accordingly, the position of the protrusion PT may be located back in one of the slot ST1. In other words, the protrusion PT may be inserted into one of the slots ST1 for fixing the second element 110B with the first element 110A.

In some embodiments, an included angle θ1 between the protrusion PT and the body BD may be an acute angle. Correspondingly, for each slot ST1, there may be a shape formed for fitting the included angle θ1 between the protrusion PT and the body BD. Accordingly, when the protrusion PT is inserted into the slot ST1, the flexible hook FH of the first element 110A may firmly hook the second element 110B.

Please refer to FIGS. 2E to 2H which are schematic views of assembling the first brace 114*a* onto the first element 110A of some embodiments of the present disclosure. The first brace 114*a* may include a first fixing element FE1. The first fixing element FE1 may have a female portion FP with a non-circular shape. The first element 110A may include a second fixing element FE2. The second fixing element FE2 may have a male portion MP with the non-circular shape.

In some embodiments, the female portion FP of the first fixing element FE1 may have recesses RC. The male portion MP of the second fixing element FE2 may have projections PJ corresponding to the recesses RC. In particular, when assembling the female portion FP with the male portion MP, the recesses RC of the female portion FP may be used for receiving the projections PJ of the male portion MP so that the male portion MP may be located with the female portion FP.

Figure 2G:
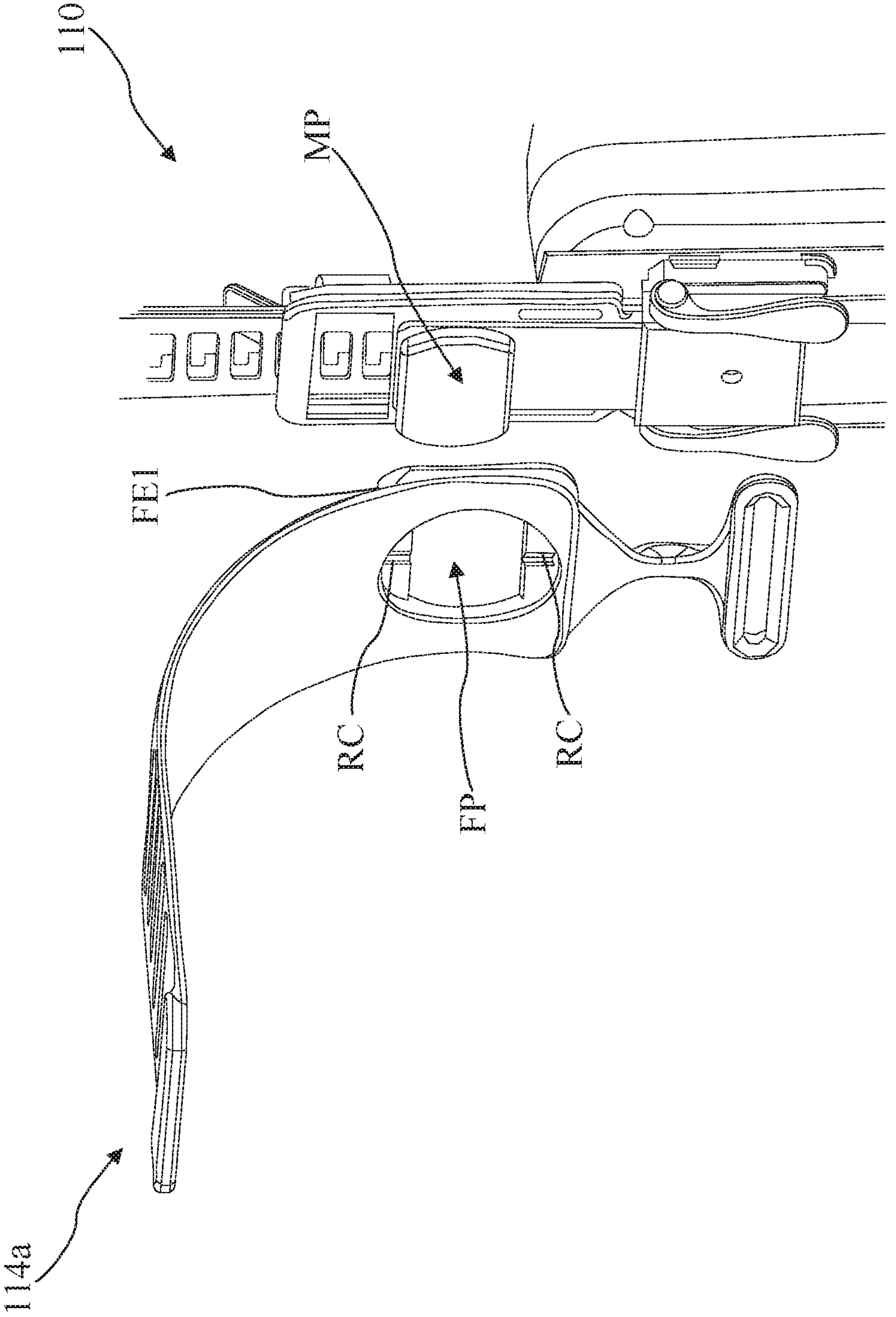
Figure 2H:
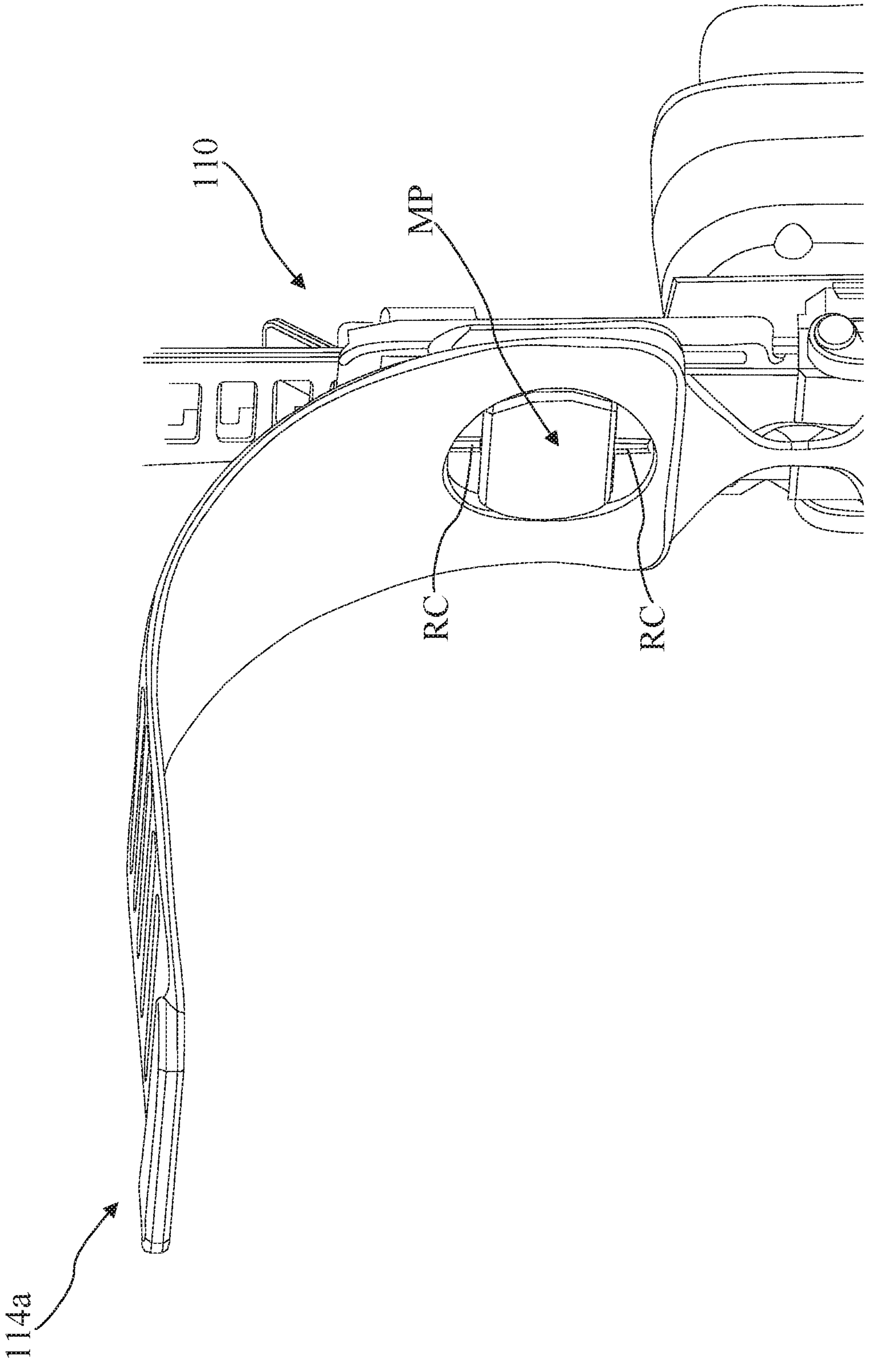
Figure 21:
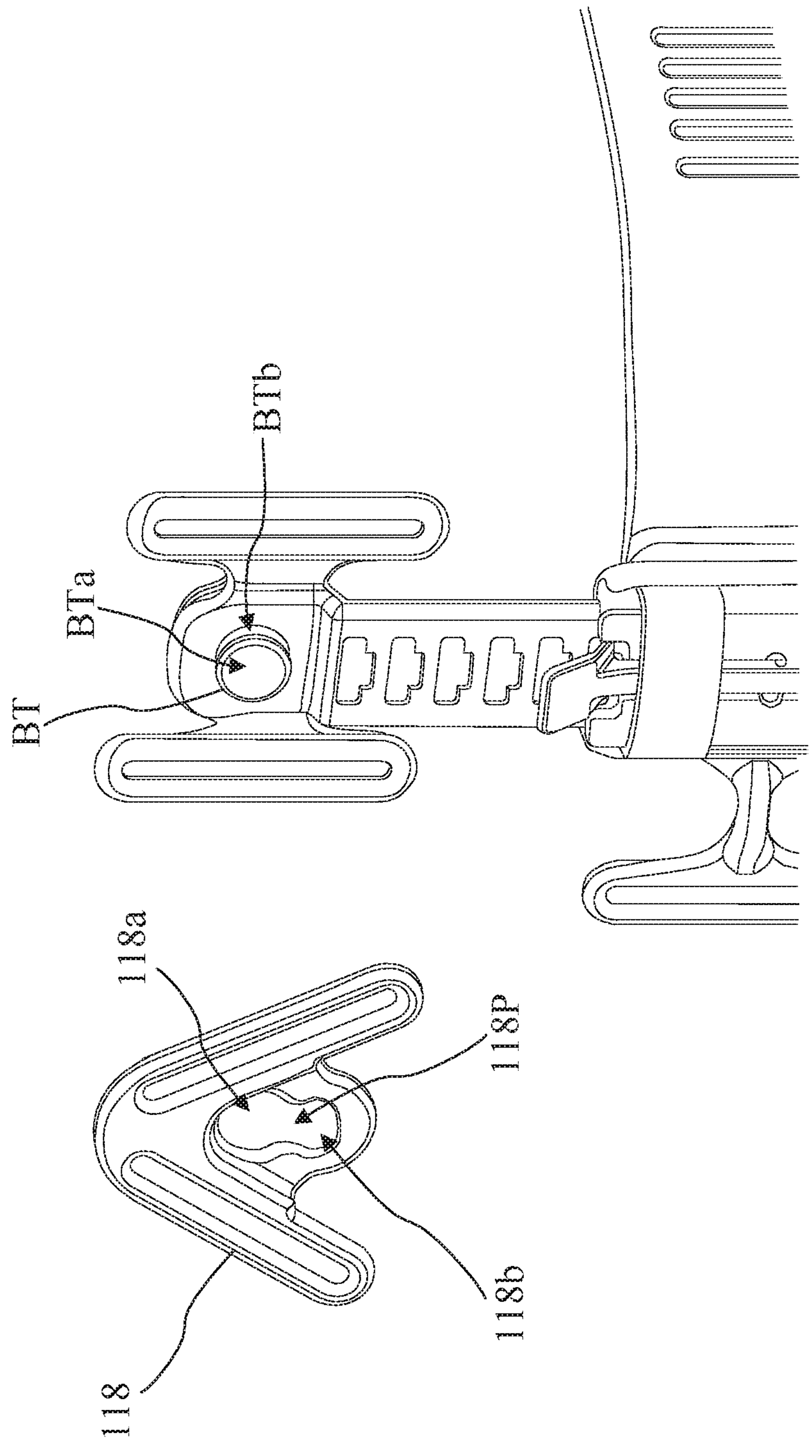

More specifically, as shown in FIG. 2G to 2H, the user may rotate the first brace 114*a* for fitting the non-circular shape of the female portion FP to the non-circular shape of the male portion MP, and then assemble the female portion FP with the male portion MP. Next, the user may rotate the first brace 114*a* for fitting the recesses RC of the female portion FP to the projections PJ of the male portion MP. Accordingly, the first brace 114*a* may be fixed with the length adjustable module 110.

In some embodiments, the first element 110A may include another fixing element having same structure of the fixing element FE2. The second brace 114*b* may have same structure of the first brace 114*a*. The another fixing element may be used for locating the second brace 114*b* as the fixing element FE2 locating the first brace 114*a*.

Figure 2J:
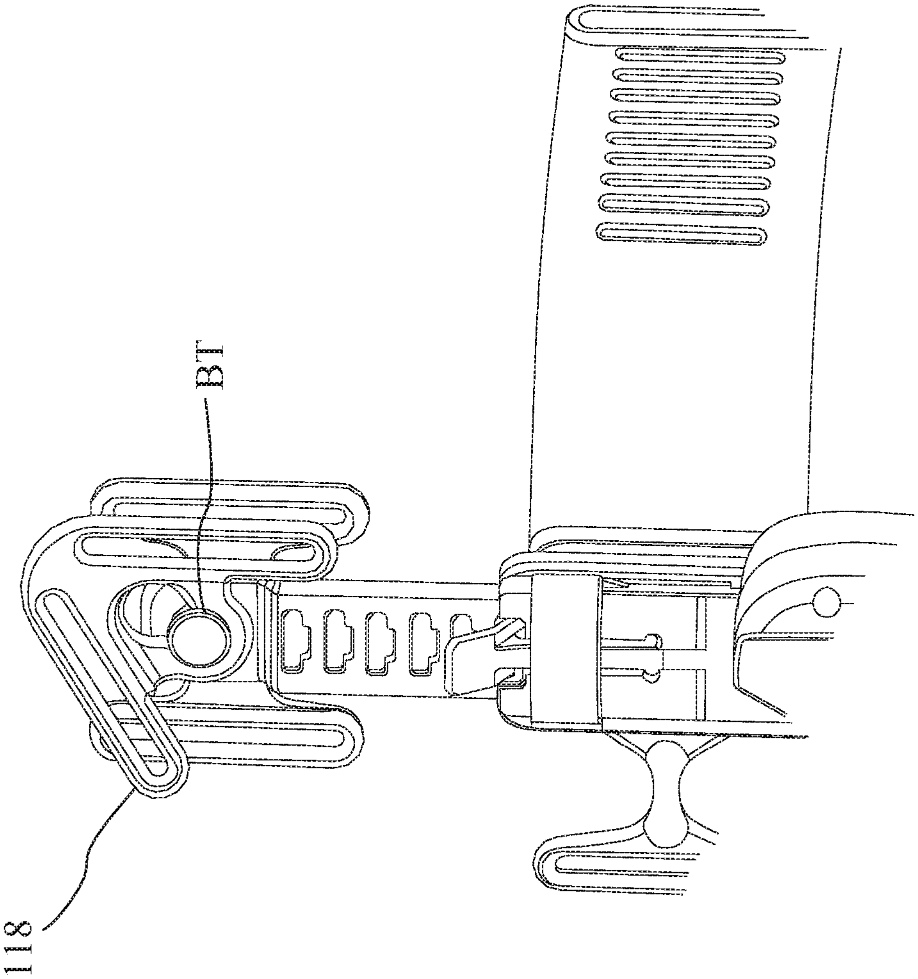

In some embodiments, the first assembly 11 may further include a hinge 118. Please refer to FIGS. 2I to 2J which illustrate the hinge 118 of the first assembly 11 of some embodiments of the present disclosure. The hinge 118 may be used for fixing the assistive device 1 to hip of user. In some implementations, the hinge 118 may be assembled with a wearable apparatus (e.g., belt) which is located with hip of user.

In detail, the hinge 118 may have two holes 118*a* and 118*b*. The holes 118*a* and 118*b* may be formed together and a path 118P may be formed between the holes 118*a* and 118*b*. The holes 118*a* and 118*b* may have circle shapes with different diameters. The second element 110B may have a button BT including a head BTa and a neck BTb. The head BTa and a neck BTb may have circle shapes with different diameters.

In some embodiments, the diameter of the hole 118*a* may be greater than the diameter of the head BTa. The diameter of the hole 118*b* may be less than the diameter of the head BTa and substantially equal to the diameter of the neck BTb.

In particular, the hole 118*a* may receive the head BTa. Then, user may apply force to shift the neck BTb to the hole 118*b* through the path 118P. Therefore, the hinge 118 may be pivoted on the button BT of the second element 110B. Accordingly, when the hinge 118 is fixed to hip of user, the first assembly 11 may be rotated relative to hip of user.

Figure 3A:
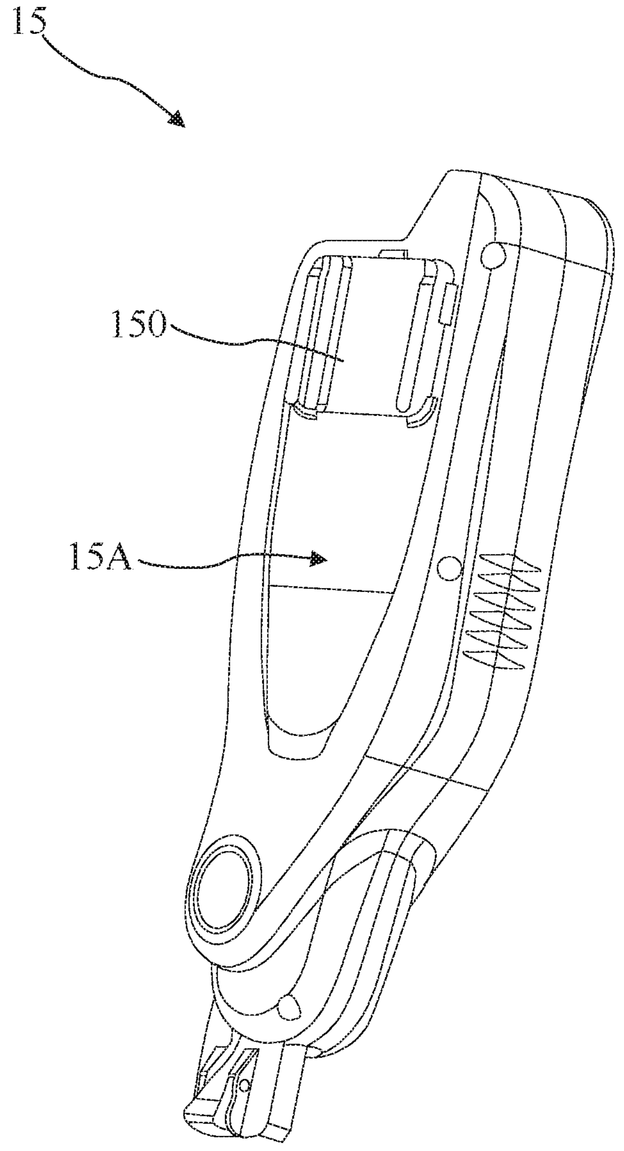
FIGS. 3A to 3B illustrate a third assembly according to some embodiments of the present disclosure.
Figure 3B:
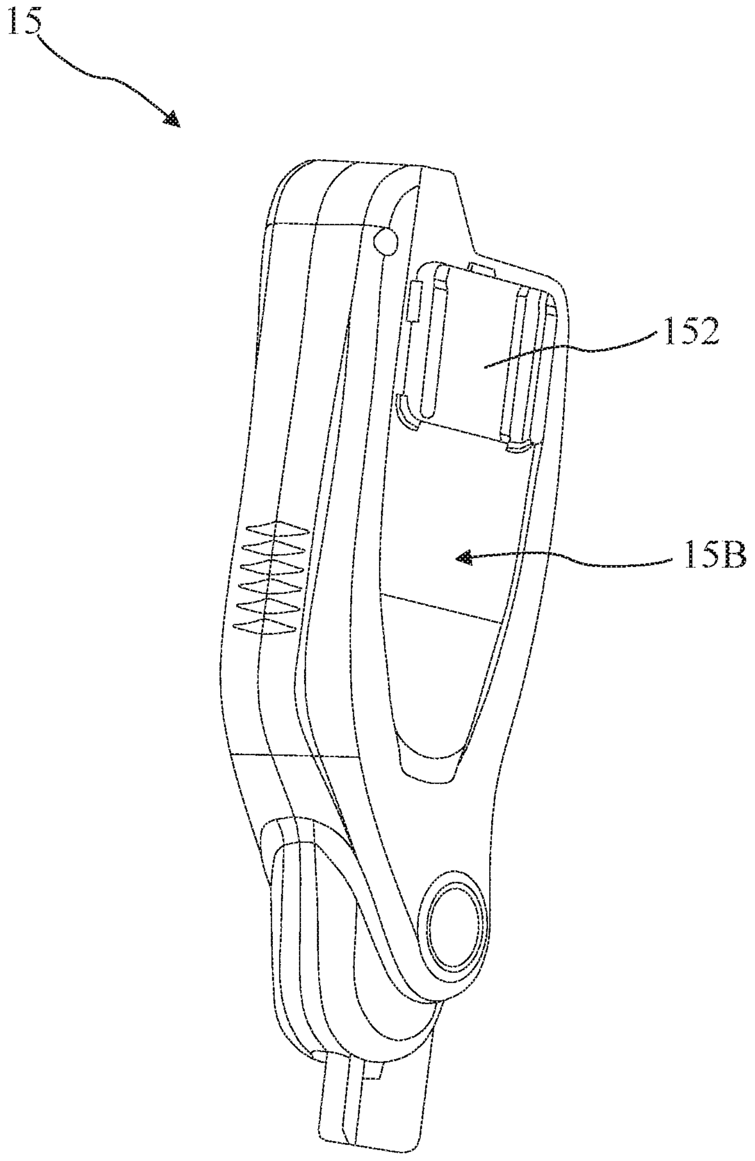

Please refer to FIGS. 3A to 3B which illustrate the third assembly 15 of some embodiments of the present disclosure. The third assembly 15 may include two receivers 150 and 152. In particular, the third assembly 15 may have two sides 15A and 15B. The receiver 150 may be fixed on side 15A, and the receiver 152 may be fixed on side 15B.

Figure 3C:
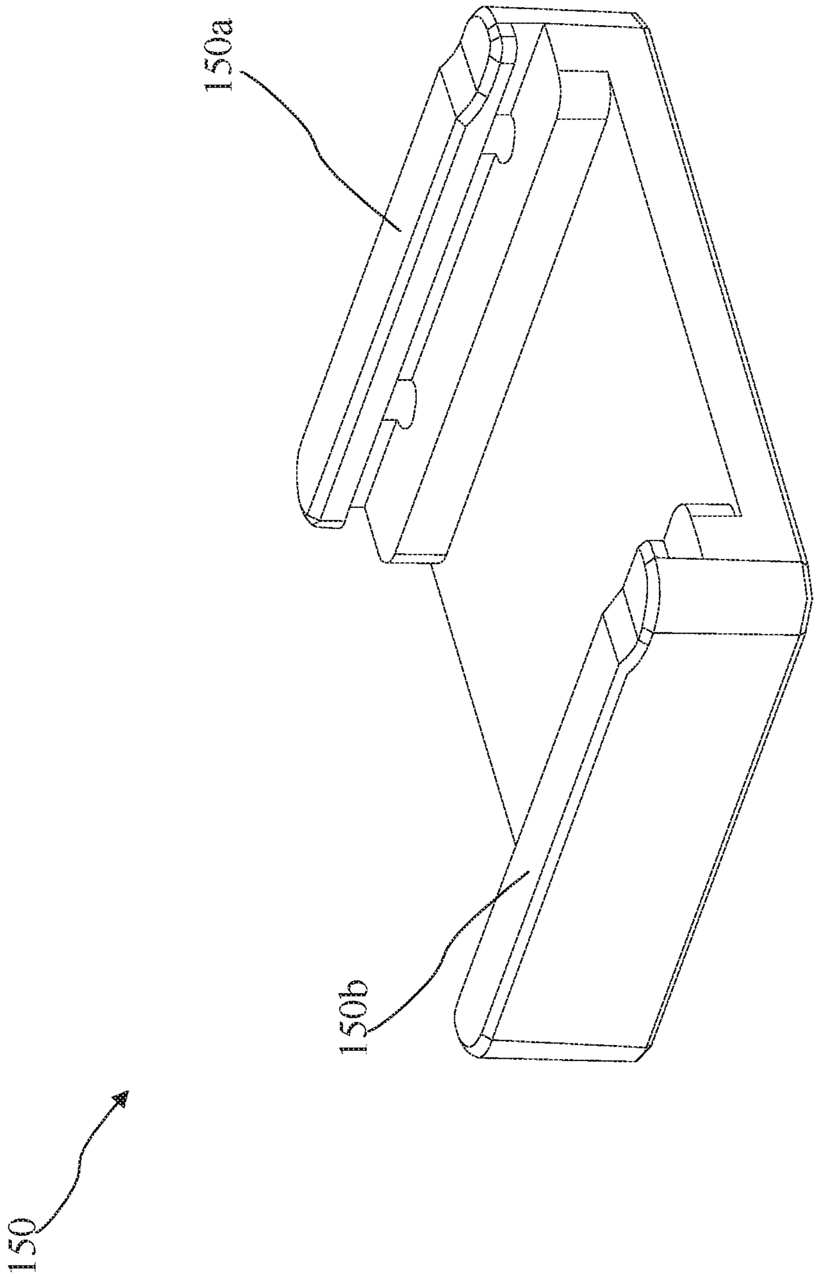
FIG. 3C illustrates a receiver of a third assembly according to some embodiments of the present disclosure.

Please refer to FIG. 3C which illustrates the receiver 150 of the third assembly 15 of some embodiments of the present disclosure. In some embodiments, the receiver 150 of the third assembly 15 may have a track structure with rails 150*a* and 150*b*.

Figure 3D:
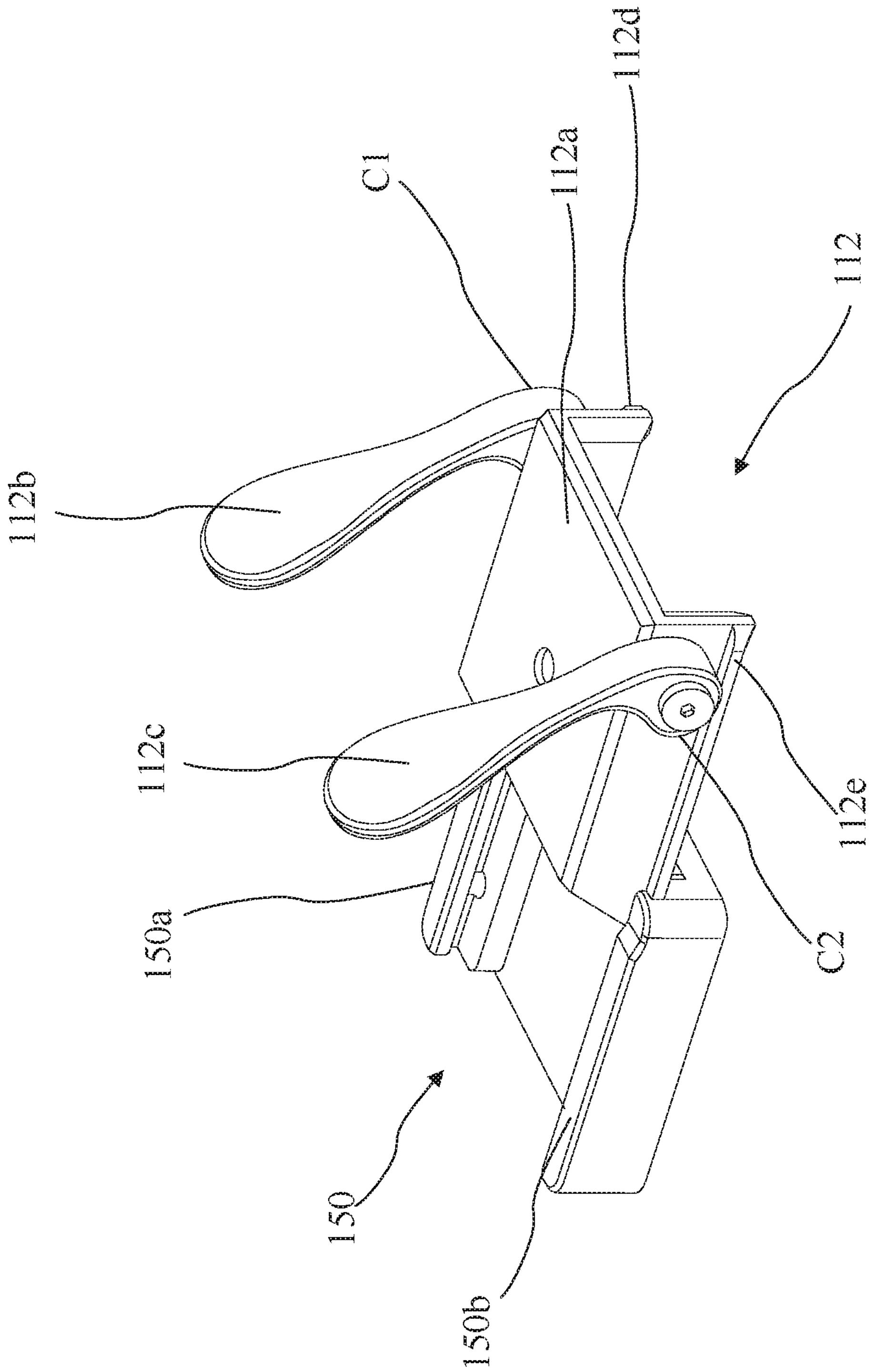
FIG. 3D is a schematic view of assembling a connecting element of a first assembly with a receiver according to some embodiments of the present disclosure.

FIG. 3D is a schematic view of assembling the connecting element 112 of the first assembly 11 with the receiver 150 of some embodiments of the present disclosure. In detail, the connecting element 112 may include a body 112*a*, a lever 112*b* with a cam C1, a lever 112*c* with a cam C2, and a wing structure having wings 112*d* and 112*e*. Shapes of the wings 112*d* and 112*e* may correspond to spaces of the rails 150*a* and 150*b* of the receiver 150.

More specifically, user may slide the wings 112*d* and 112*e* of the connecting element 112 along webs of the rails 150*a* and 150*b* of the receiver 150. Therefore, head of the rail 150*a* may be located is between the wing 112*d* and the lever 112*b* with the cam C1, and head of the rail 150*b* may be located between the wing 112*e* and the lever 112*c* with the cam C2.

Then, user may rotate the lever 112*b* toward the rail 150*a* so that the cam C1 and the wing 112*d* may clamp the head of the rail 150*a*. Similarly, user may rotate the lever 112*c* toward the rail 150*b* so that the cam C2 and the wing 112*e* may clamp the head of the rail 150*b*.

Accordingly, based on assembling the connecting element 112 of the first assembly 11 and the receiver 150 of the third assembly 15, the first assembly 11 may be fixed on the side 15A of the third assembly 15.

Alternatively, in some embodiments, because the receiver 152 may have same structure of the receiver 150, the first assembly 11 may be fixed on the side 15B of the third assembly 15 by assembling the connecting element 112 with the receiver 152.

Figure 3E:
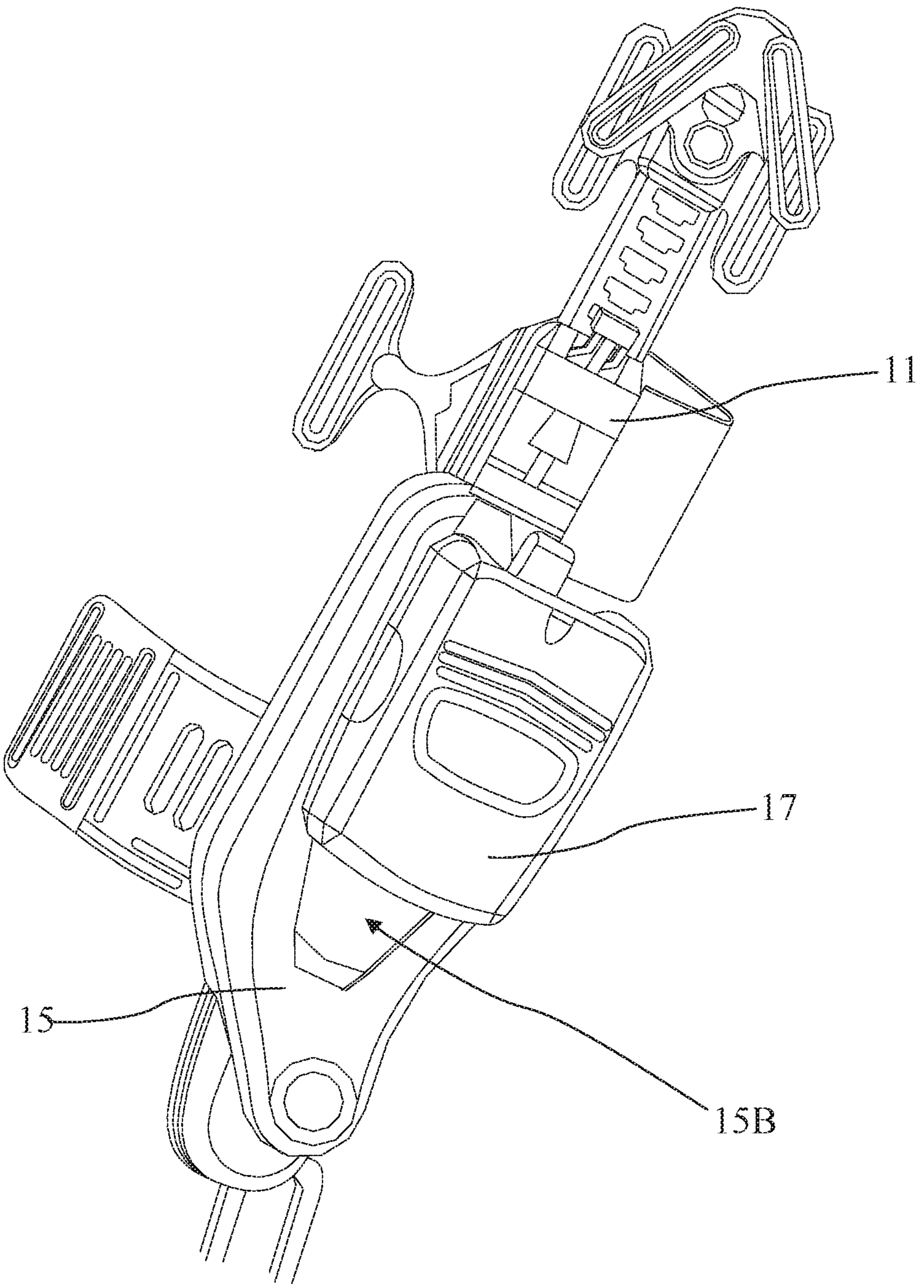
FIGS. 3E to 3F are schematic views of assembling a first assembly, a third assembly 15 and a controller according to some embodiments of the present disclosure.
Figure 3F:
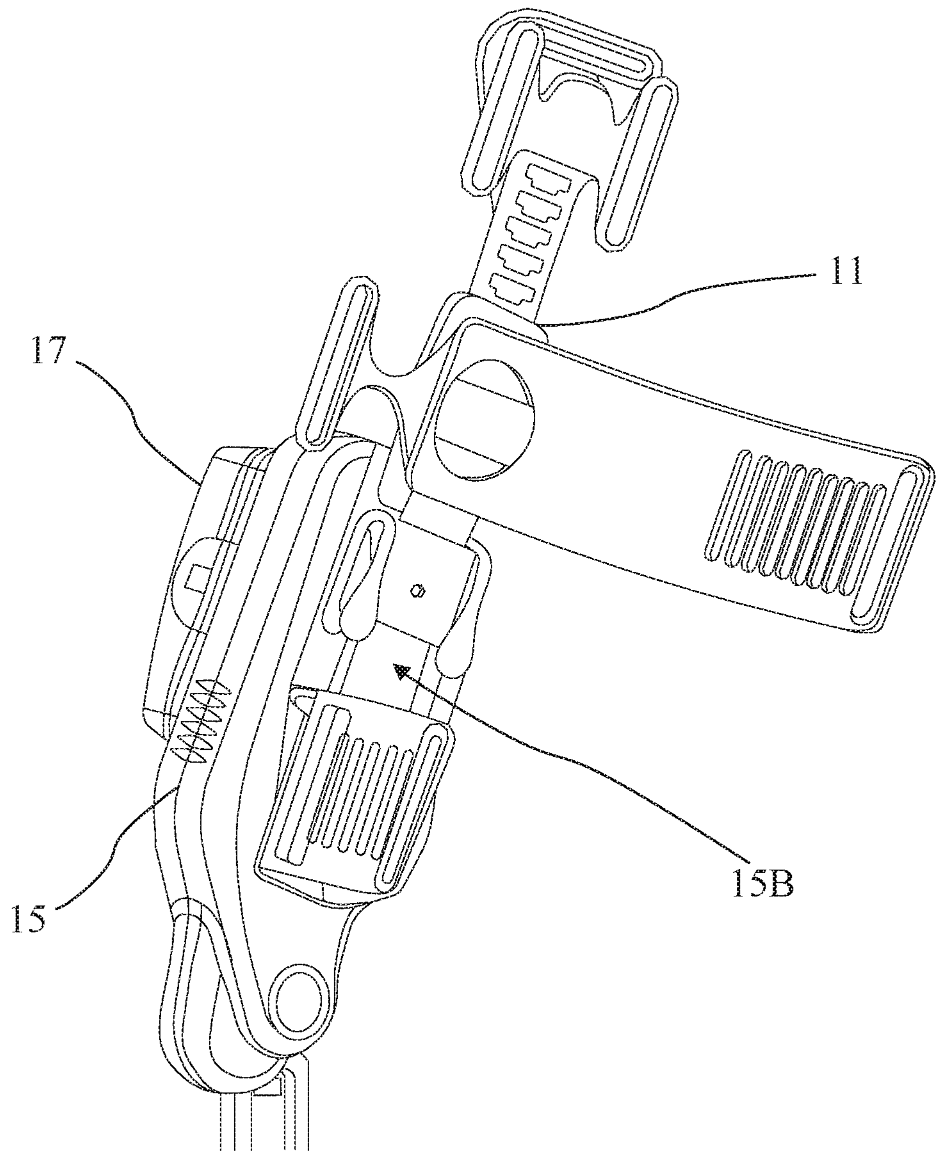

In some embodiments, the assistive device 1 may further include a controller 17. Please refer to FIGS. 3E to 3F which are schematic views of assembling the first assembly 11, the third assembly 15 and the controller 17.

In particular, when the first assembly 11 is fixed on the side 15A of the third assembly 15, the controller 17 may be received by the receiver 152 on the side 15B of the third assembly 15. When the first assembly 11 is fixed on the side 15B of the third assembly 15, the controller 17 may be received by the receiver 150 on the side 15A of the third assembly 15.

Figure 4A:
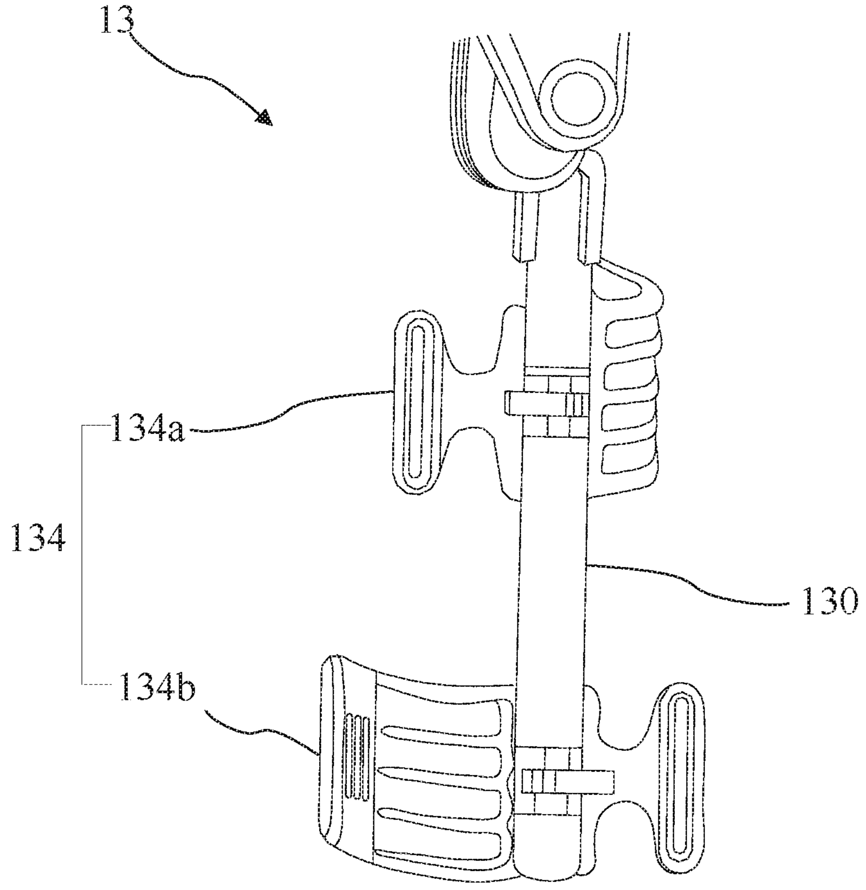
FIG. 4A illustrates a second assembly according to some embodiments of the present disclosure.

Please refer to FIG. 4A which illustrates the second assembly 13 of some embodiments of the present disclosure. In particular, the second assembly 13 may include a body 130 and a brace set 134. The brace set 134 may have a brace 134*a* and a brace 134*b*.

Figure 4B:
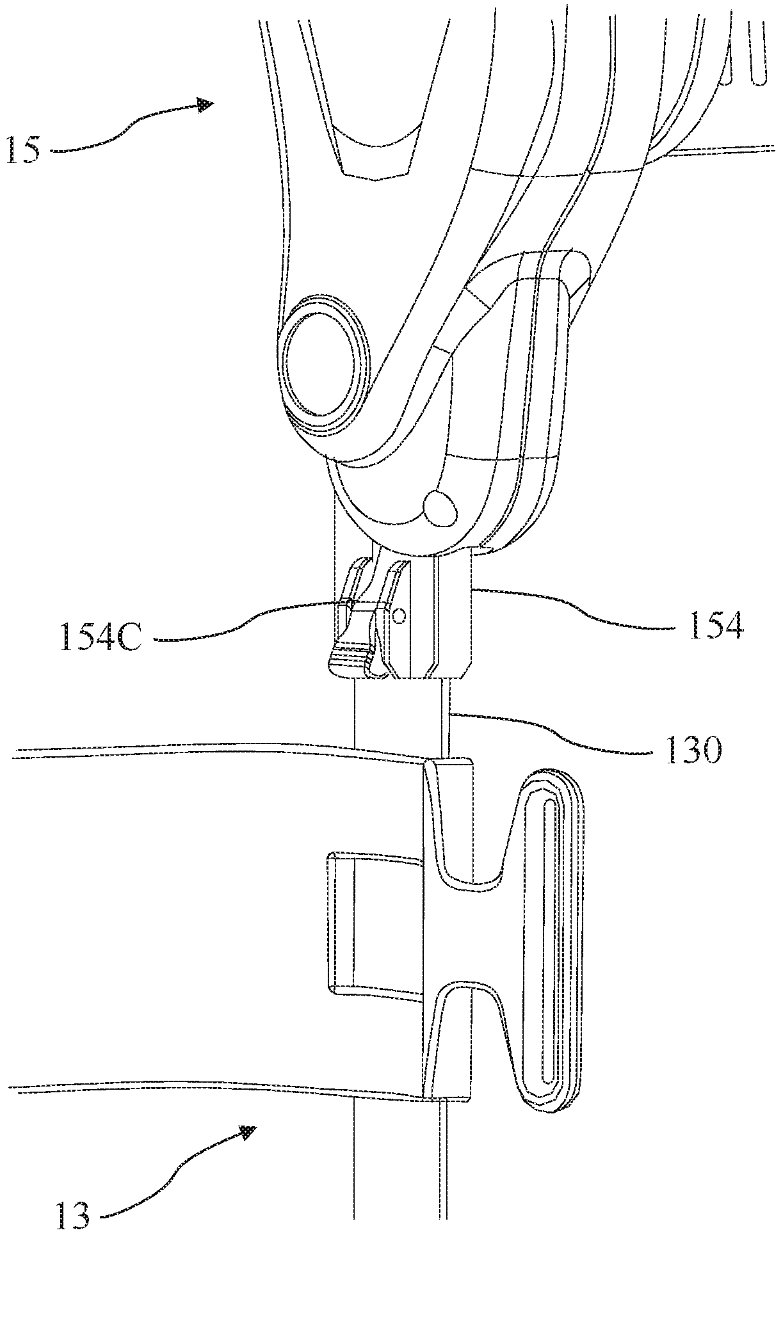
FIG. 4B is a schematic view of assembling a second assembly to a third assembly according to some embodiments of the present disclosure.
Figure 4C:
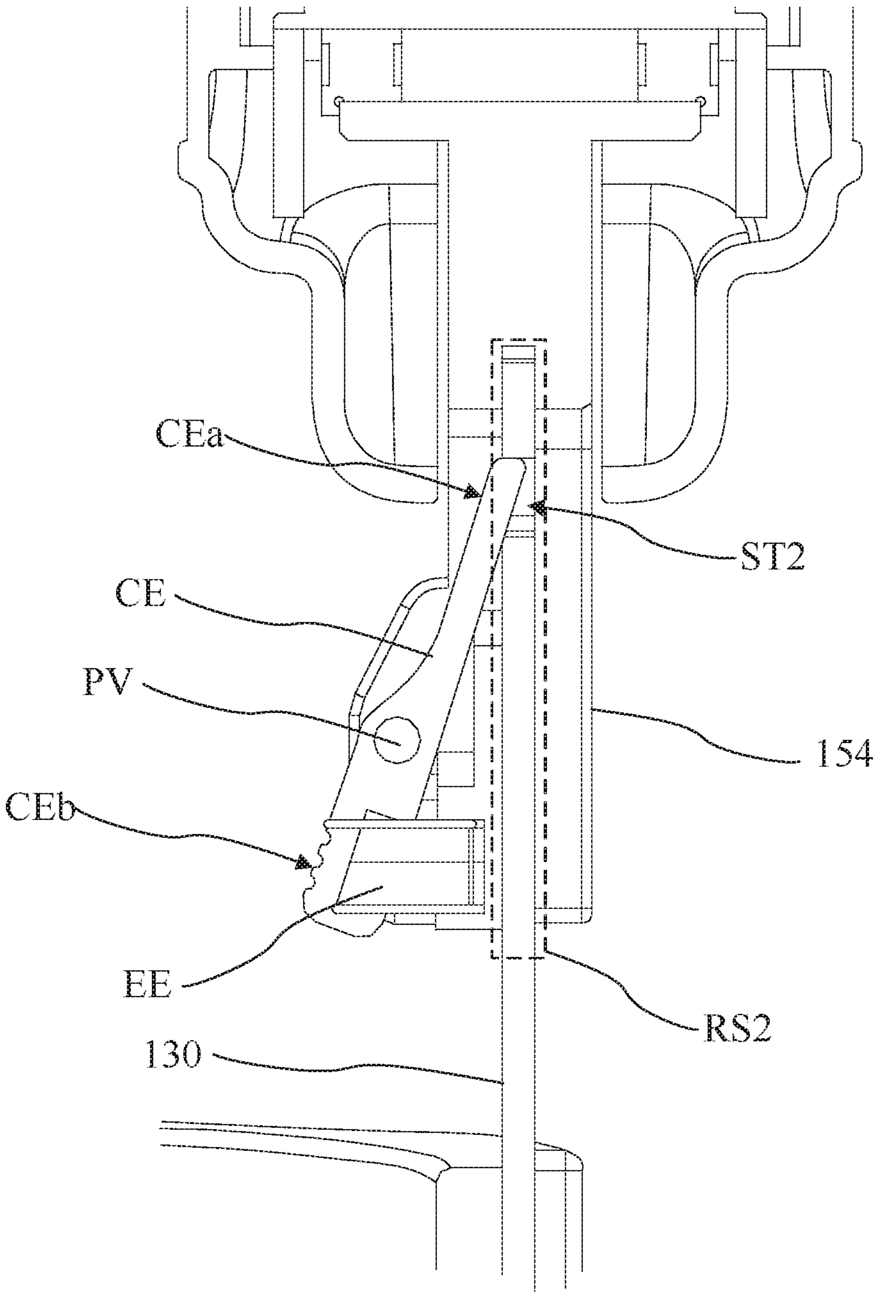
FIG. 4C is a cross-section view of assembling a second assembly to a third assembly according to some embodiments of the present disclosure.

Please refer to FIGS. 4B to 4C. FIG. 4B is a schematic view of assembling the second assembly 13 to the third assembly 15 of some embodiments of the present disclosure. FIG. 4C is a cross-section view of assembling the second assembly 13 to the third assembly 15 of some embodiments of the present disclosure.

In detail, the body 130 may have a strip shape, and a slot ST2 may be formed on one end of the body 130. The third assembly 15 may have a rotating module 154 which is used for connecting with the second assembly 13 and rotating the second assembly. The rotating module 154 may have a clip module 154C. The clip module 154C may have a receiving space RS2, a clip element CE, a pivot PV and an elastic element EE.

More specifically, as shown in FIG. 4C, when the receiving space RS2 receives the body 130 of the second assembly 13, one end CEa of the clip element CE may be wedged in the slot ST2. When the end CEa of the clip element CE is wedged in the slot ST2, the elastic element EE may apply a force to support another end CEb of the clip element CE. Therefore, by the pivot PV, the end CEa of the clip element CE may be firmly wedged in the slot ST2. Accordingly, the second assembly 13 may be fixed to the third assembly 15.

When the user needs to detach the second assembly 13 from the third assembly 15, the user may apply force to the end CEb of the clip element CE to shrink the elastic element EE. Therefore, by the pivot PV, the end CEa of the clip element CE may be pulled out from the slot ST2. Accordingly, the user may detach the second assembly 13 from the third assembly 15.

Figure 4D:
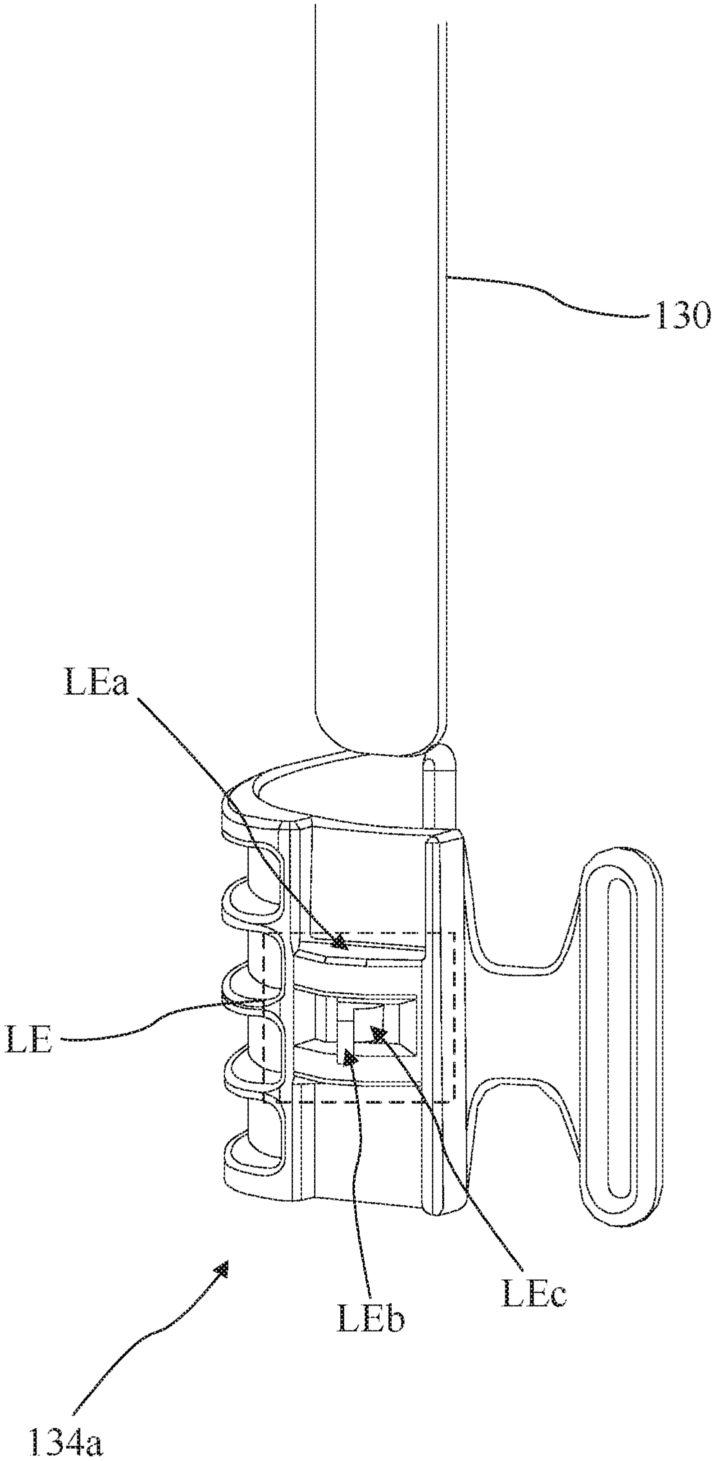
FIG. 4D is a schematic view of assembling a brace to a body of a second assembly according to some embodiments of the present disclosure.

Please refer to FIG. 4D which is a schematic view of assembling the brace 134*a* to the body 130 of the second assembly 13. The brace 134*a* may have a fastener LE. The fastener LE may have a penetration hole LEa and a lever LEb with a cam LEc.

As shown in FIG. 4D, user may take the second assembly 13 and penetrate the penetration hole LEa with the body 130 of the second assembly 13. Next, user may adjust the brace 134*a* to a required location along the body 130. When user decides the location of the brace 134*a*, user may rotate the lever LEb with the cam LEc so that the cam LEc may be against the body 130 of the second assembly 13. Accordingly, the brace 134*a* may be fixed on the body 130 of the second assembly 13.

In some embodiments, the brace 134*b* may have same structure of the brace 134*a*. The brace 134*b* may be fixed on the body 130 of the second assembly 13 as the brace 134*a* being fixed on the body 130 of the second assembly 13.

Figure 5:
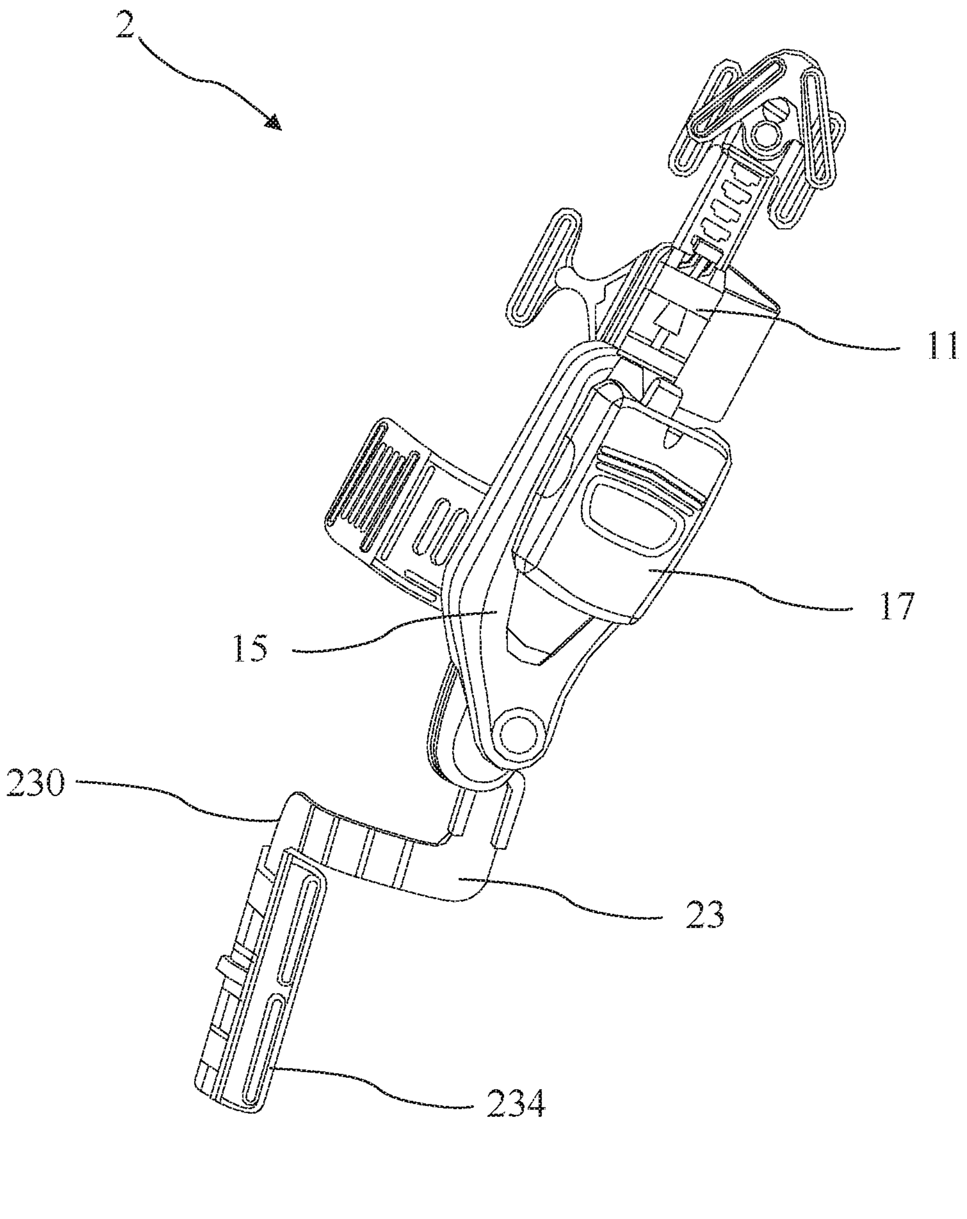
FIG. 5 illustrates an assistive device according to some embodiments of the present disclosure.

FIG. 5 illustrates another assistive device 2 of some embodiments of the present disclosure. The assistive device 2 may be similar to the assistive device 1 but a slightly different. In particular, the assistive device 2 may include the first assembly 11, a second assembly 23, the third assembly 15 and the controller 17.

More specifically, in the above embodiments, the body 130 of the second assembly 13 may be located on only one side (e.g., left side or right side) of user's shank because the body 130 of the second assembly 13 is straight.

In some embodiments, as shown in FIG. 5, a body 230 of the second assembly 23 may be extended from one side (e.g., left side or right side) of user's shank to another side (e.g., front side) of user's shank.

In addition, one end of the body 230 of the second assembly 23 may be attached to the rotating module 154 of the third assembly 15 as the body 130 attached to the rotating module 154 of the third assembly 15. A brace 234 may be fixed on the body 230 of the second assembly 23 as the brace 134*a* being fixed on the body 130 of the second assembly 13.

Figure 6A:
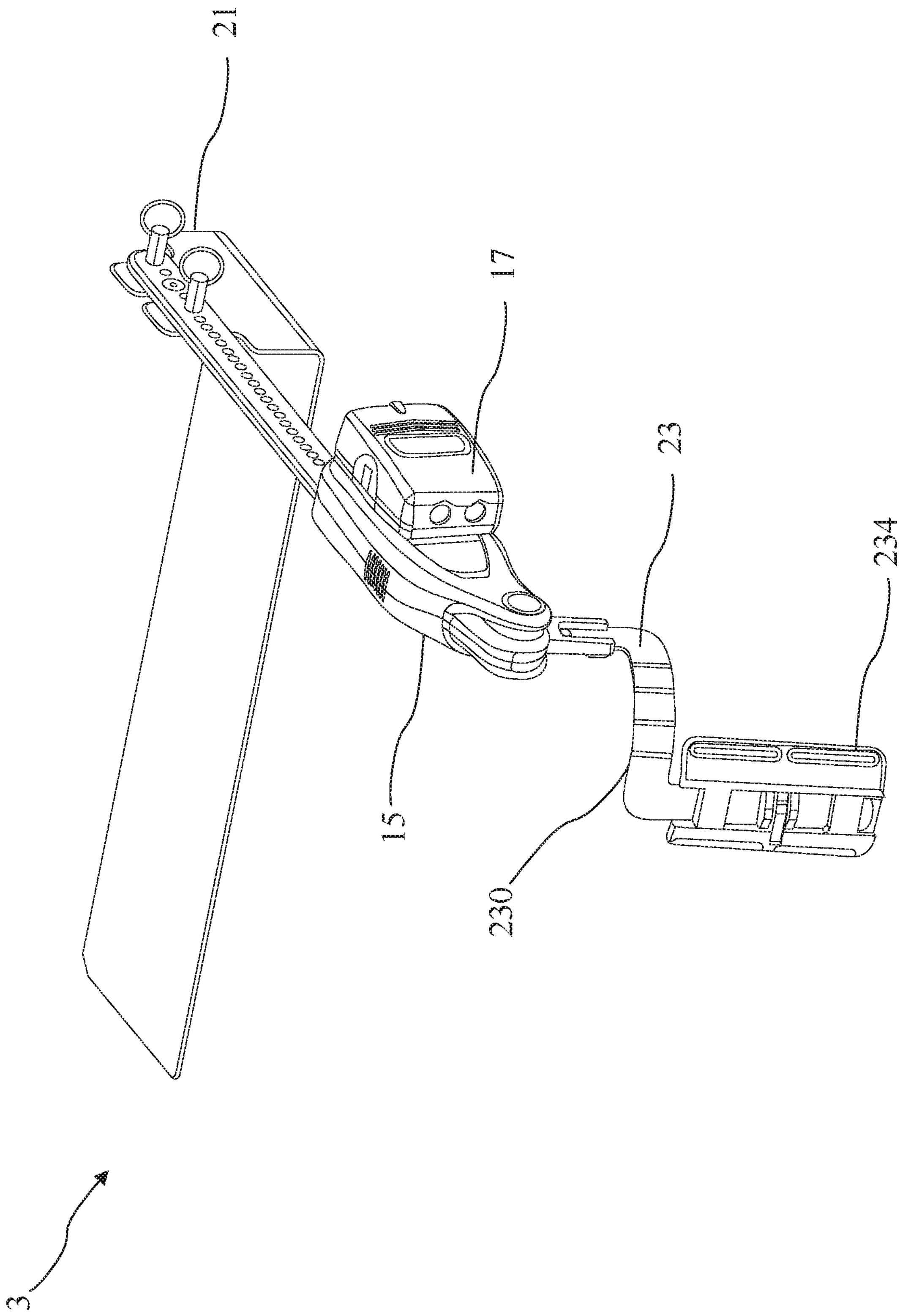
FIG. 6A illustrates an assistive device according to some embodiments of the present disclosure.

FIG. 6A illustrates another assistive device 3 of some embodiments of the present disclosure. The assistive device 3 may be similar to the assistive device 2 but a slightly different. In particular, the assistive device 3 includes a first assembly 31, the second assembly 23, the third assembly 15 and the controller 17.

Figure 6B:
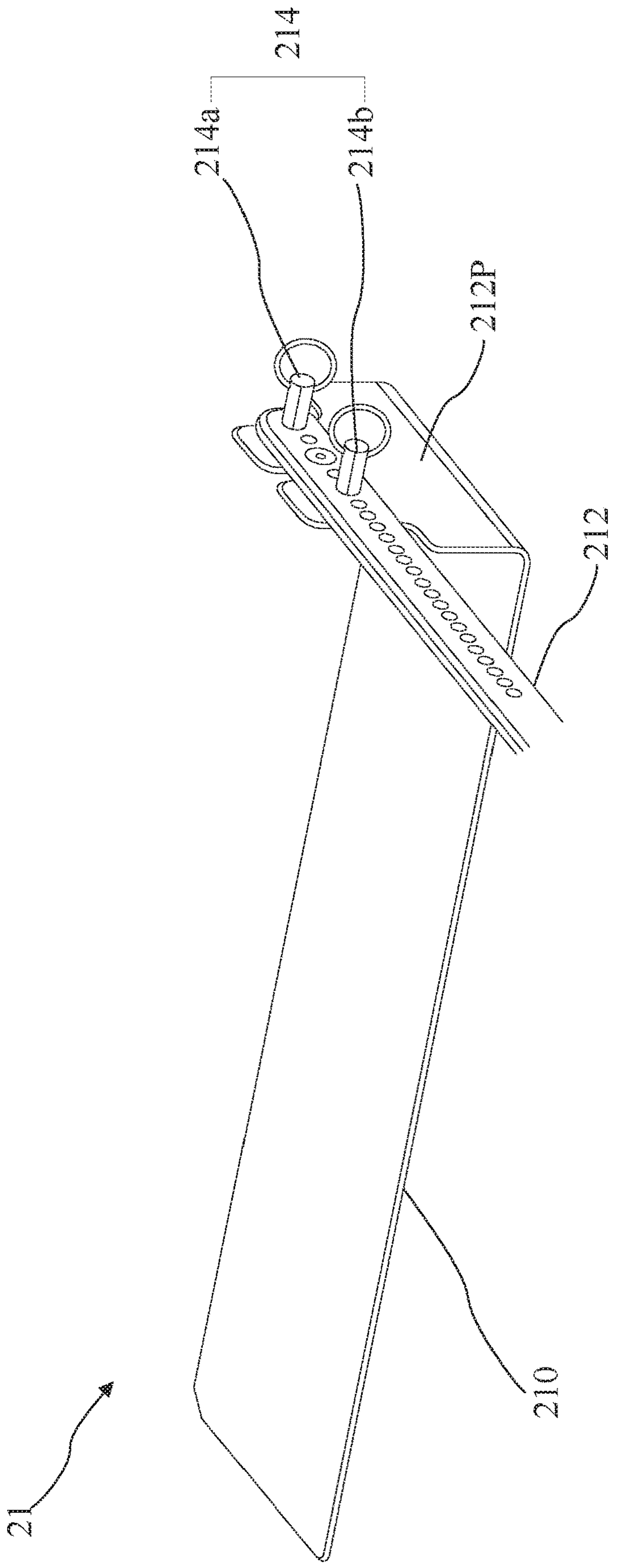
FIG. 6B illustrates a first assembly according some embodiments of the present disclosure.

Please refer to FIG. 6B which illustrates the first assembly 21 of some embodiments of the present disclosure. The first assembly 21 includes a body 210 used against user, a connecting element 212 and a plug set 214 which includes a first plug 214*a* and a second plug 214*b*.

In detail, the body 210 may substantially have a plate shape, and one part 210P of the body 210 may be bent. The part 210P may have two holes, and the connecting element 212 may have at least two holes corresponding to the holes of the part 210P of the body 210. User may insert the plug 214*a* through one hole of the part 210P and through one hole of the connecting element 212 at the same time. User may insert the plug 214*b* through another hole of the part 210P and through another hole of the connecting element 212 at the same time.

Accordingly, the connecting element 212 may be fixed to the body 210 by the plugs 214*a* and 214*b*. Further, a distance between the first assembly 21 and the third assembly 15 may be adjustable by inserting the plug set 214 in different holes. In some embodiments, the connecting element 212 may be assembled with the third assemble 15 as the connecting element 112 assembled with the third assemble 15.

Figure 6C:
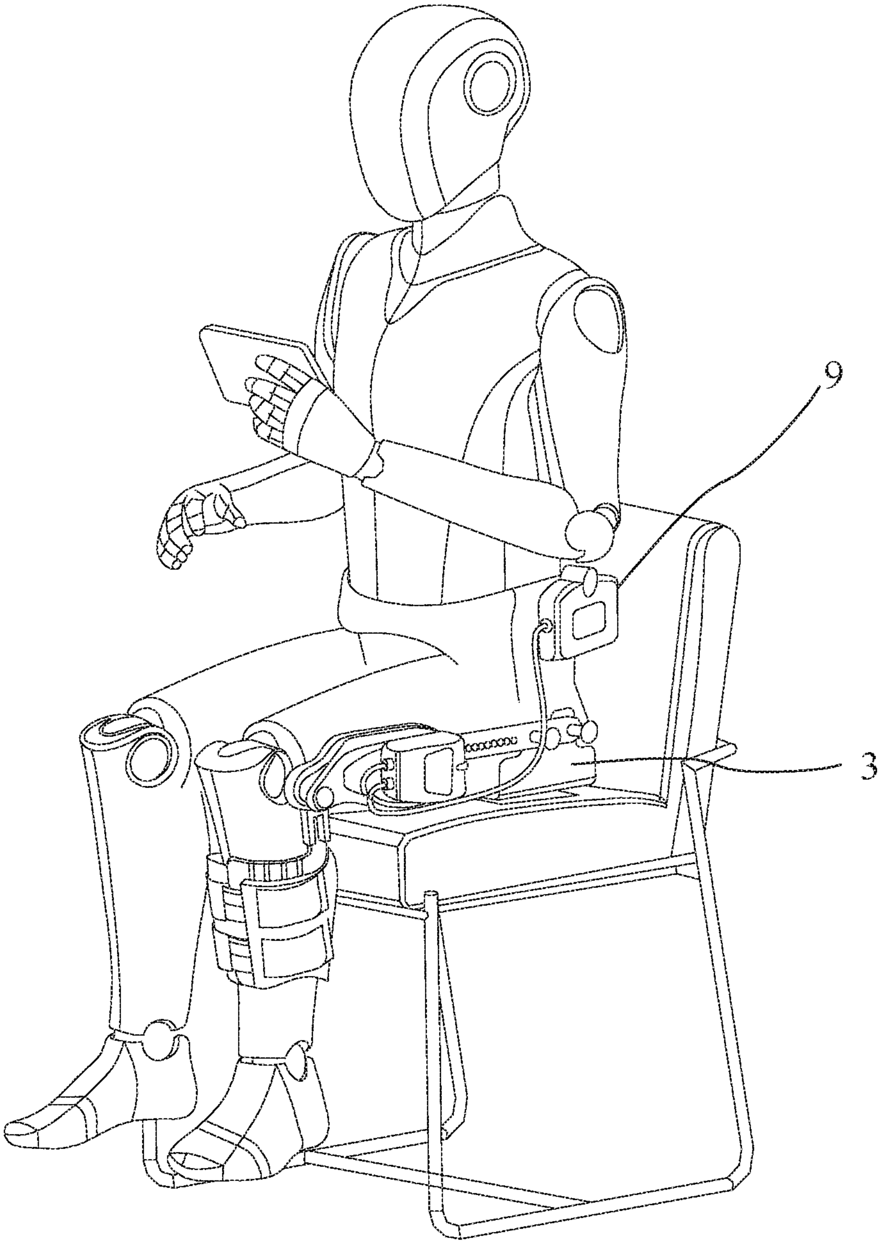
FIG. 6C is a schematic view of using an assistive device according to some embodiments of the present disclosure.

Please refer to FIG. 6C which is a schematic view of using the assistive device 3 of some embodiments of the present disclosure. In particular, when user sits on the body 210 of the first assembly 21, the assistive device 3 may be fixed by user. Accordingly, user may train his/her thigh with the assistant provided by the assistive device 3. In some embodiments, the assistive device 3 may be powered by a battery 9.

Figure 7:
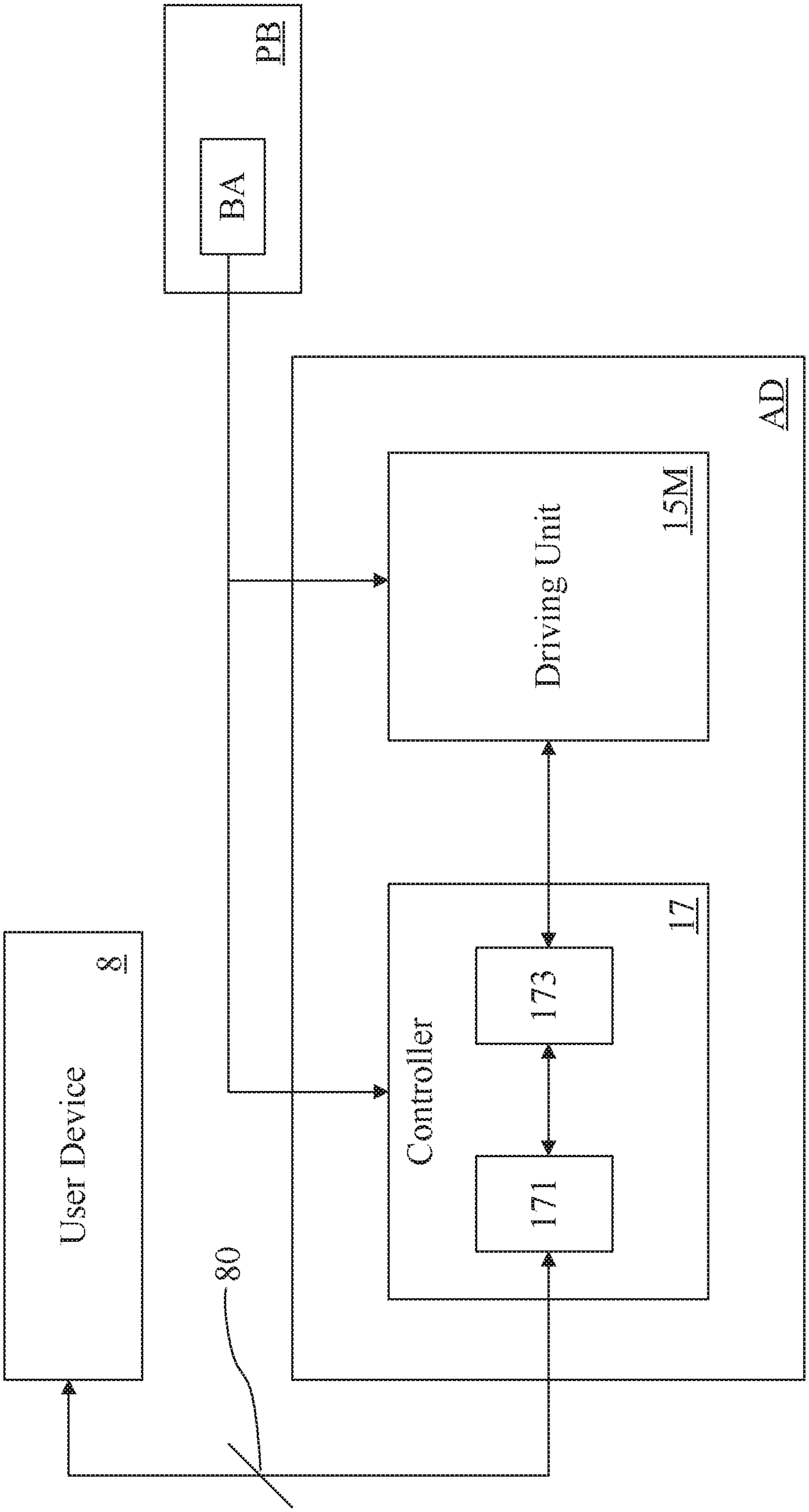
FIG. 7 is a block diagram of an assistive device interacting with other devices according to some embodiments of the present disclosure.

Please refer to FIG. 7 which is a block diagram of the assistive device AD (i.e., the assistive device 1, 2 or 3) interacting with other devices of some embodiments of the present disclosure. The controller 17 of the assistive device may include a wireless communication module 171 and a micro controller unit (MCU) 173. The wireless communication module 171 may be electrically connected to the MCU 173 (e.g., electrically connected via communication bus).

In detail, the wireless communication module 171 may be used for receiving a control signal 80 from a user device 8. The MCU may control a driving unit 15M (e.g., a unit including the motor 1509 and the encoder 1510) of the third assembly 15 according to the control signal 80.

In some embodiments, the controller 17 may further include a physical button set (not shown). The physical button set may be used to control the driving unit 15M of the third assembly 15. For example, the controller 17 is configured with different assistive modes and assistive levels. The physical button set is used to select the assistive modes and to tune the assistive levels so that the driving unit 15M of the third assembly 15 is controlled with different statuses.

In some embodiments, a cable set (not shown) including power wires and signal wires may be used to connect the components of the assistive device and a power belt PB. In detail, the power belt PB may include a battery BA. The battery BA may be used to provide electrical energy to the driving unit 15M of the third assembly 15 and to the controller 17.

Figure 8A:
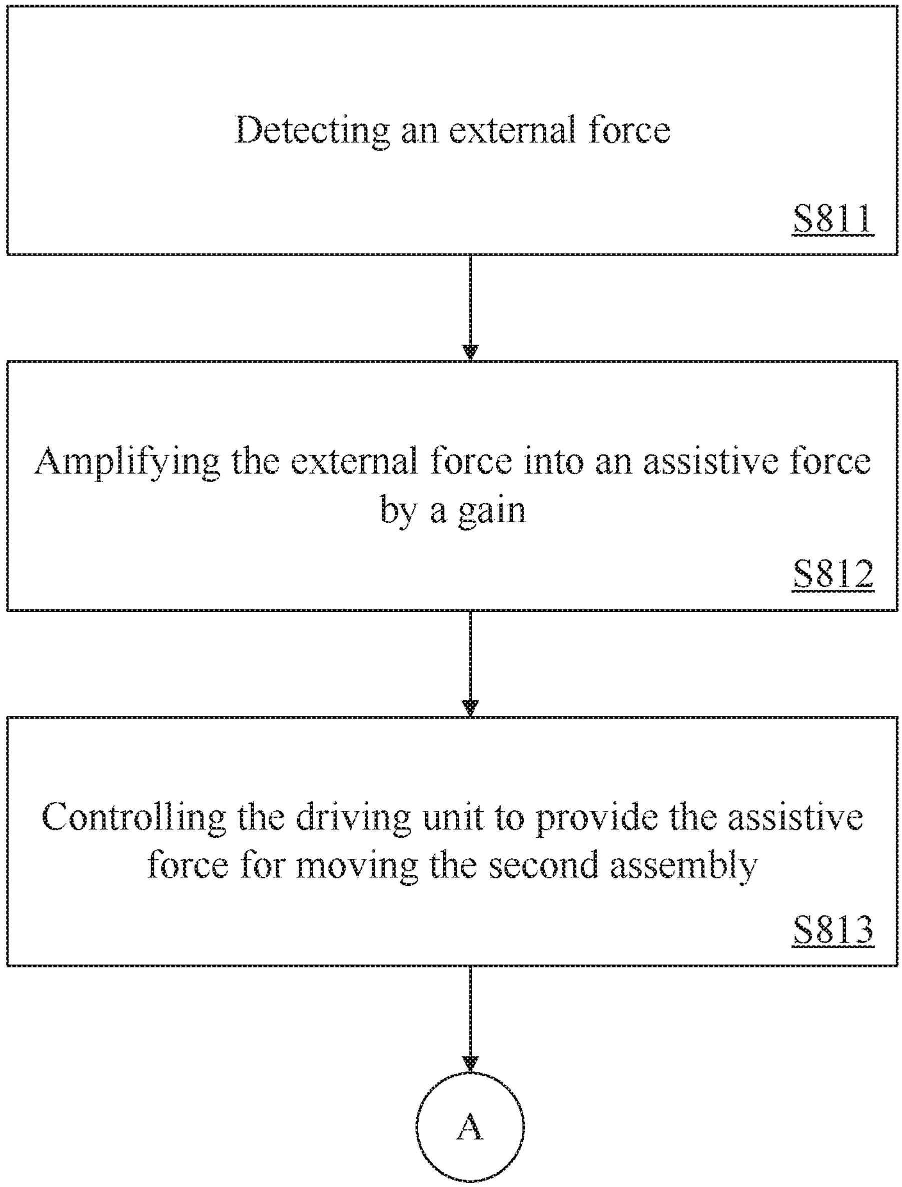
FIGS. 8A and 8B are flow charts of a control method for an assistive device according to some embodiments of the present disclosure.
Figure 8B:
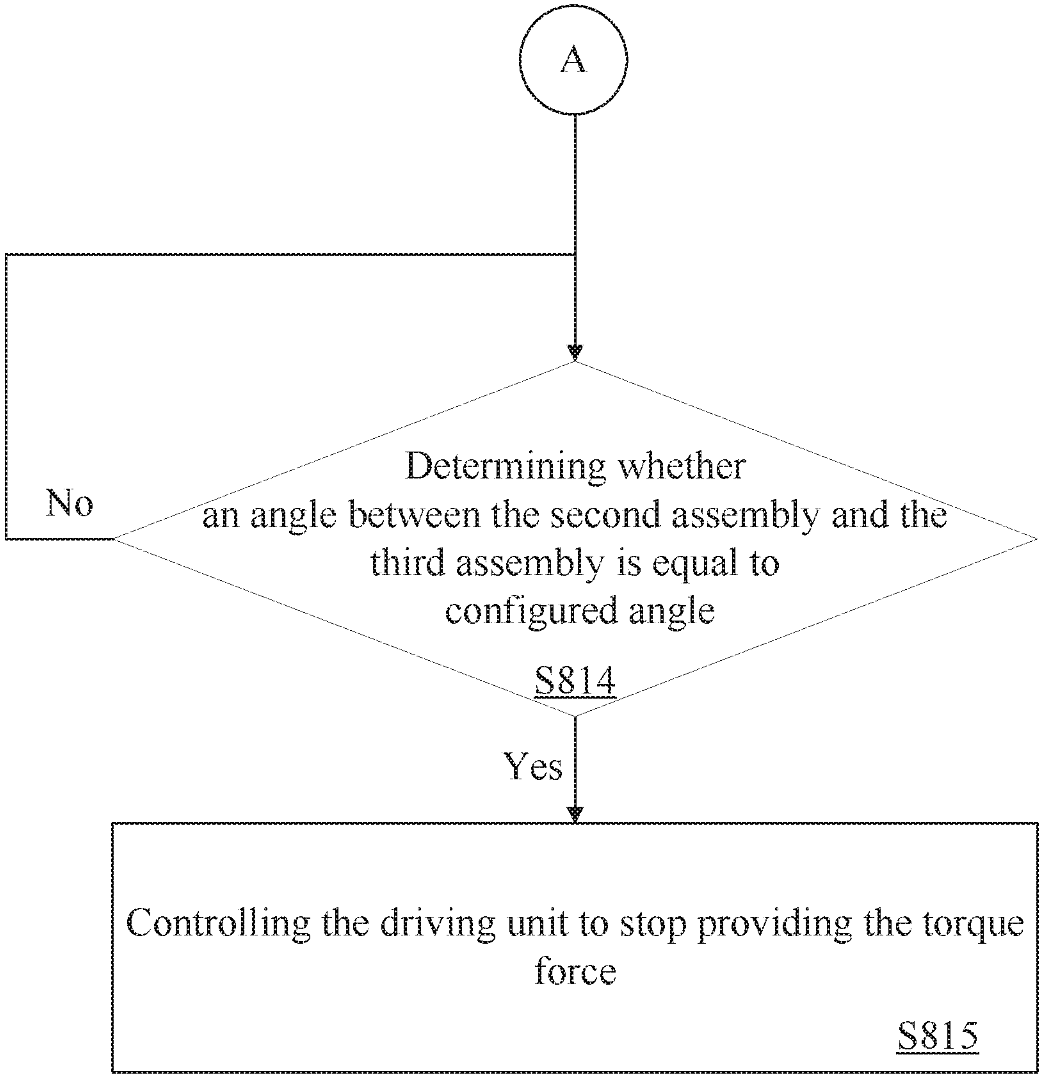
Figure 9A:
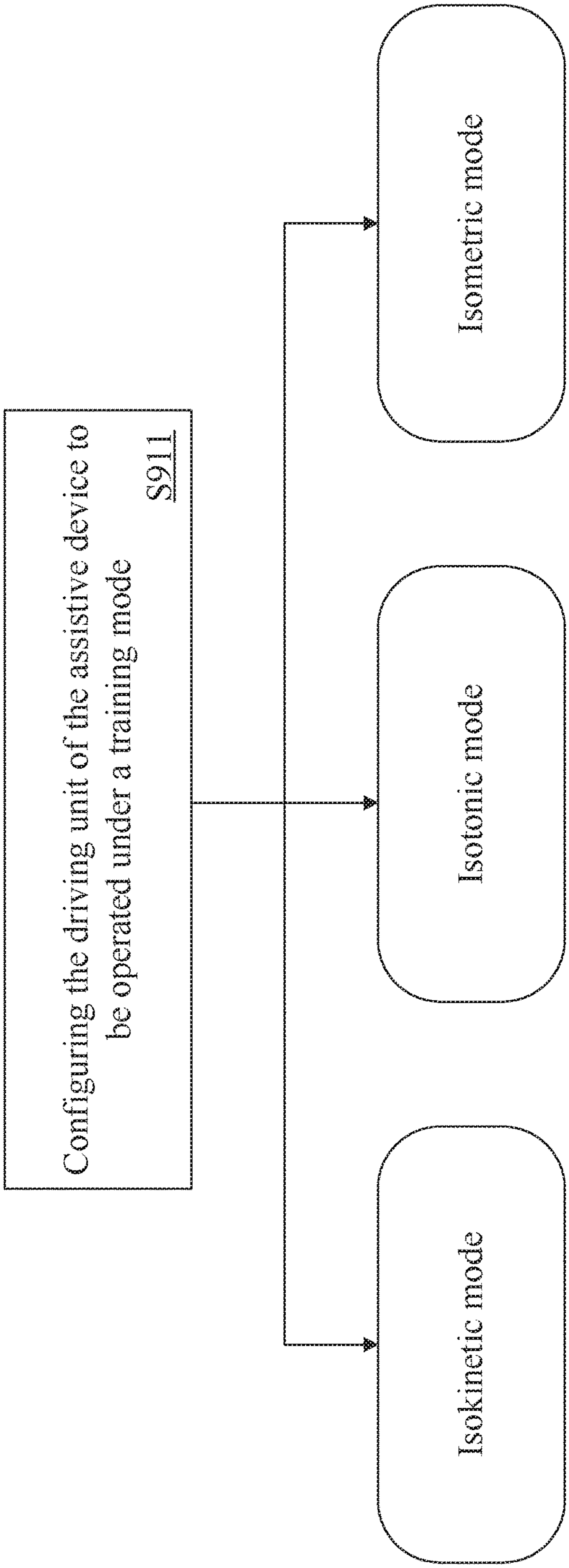
FIGS. 9A to 9D are flow charts of a control method for an assistive device according to some embodiments of the present disclosure.
Figure 9B:
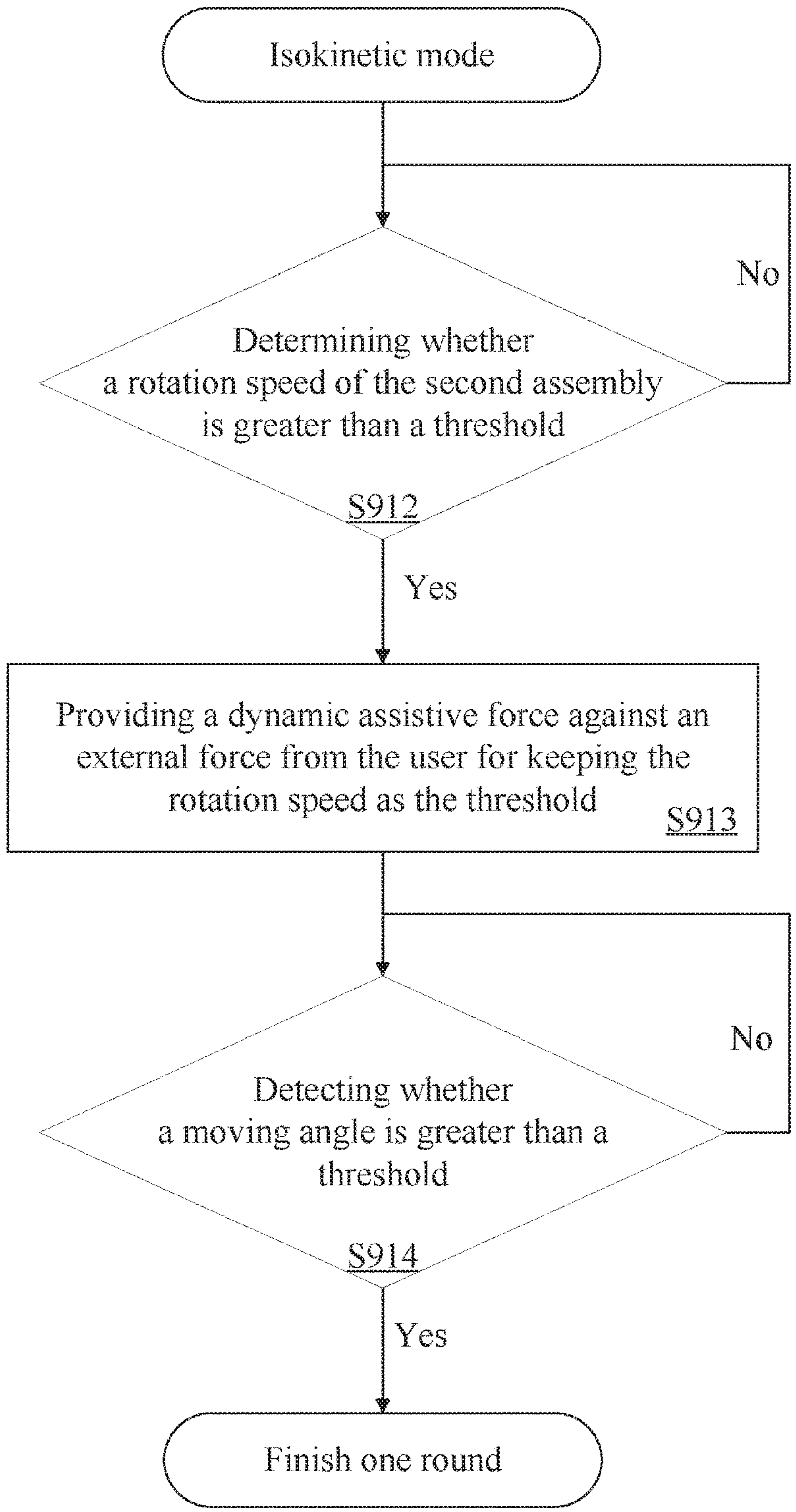
Figure 9C:
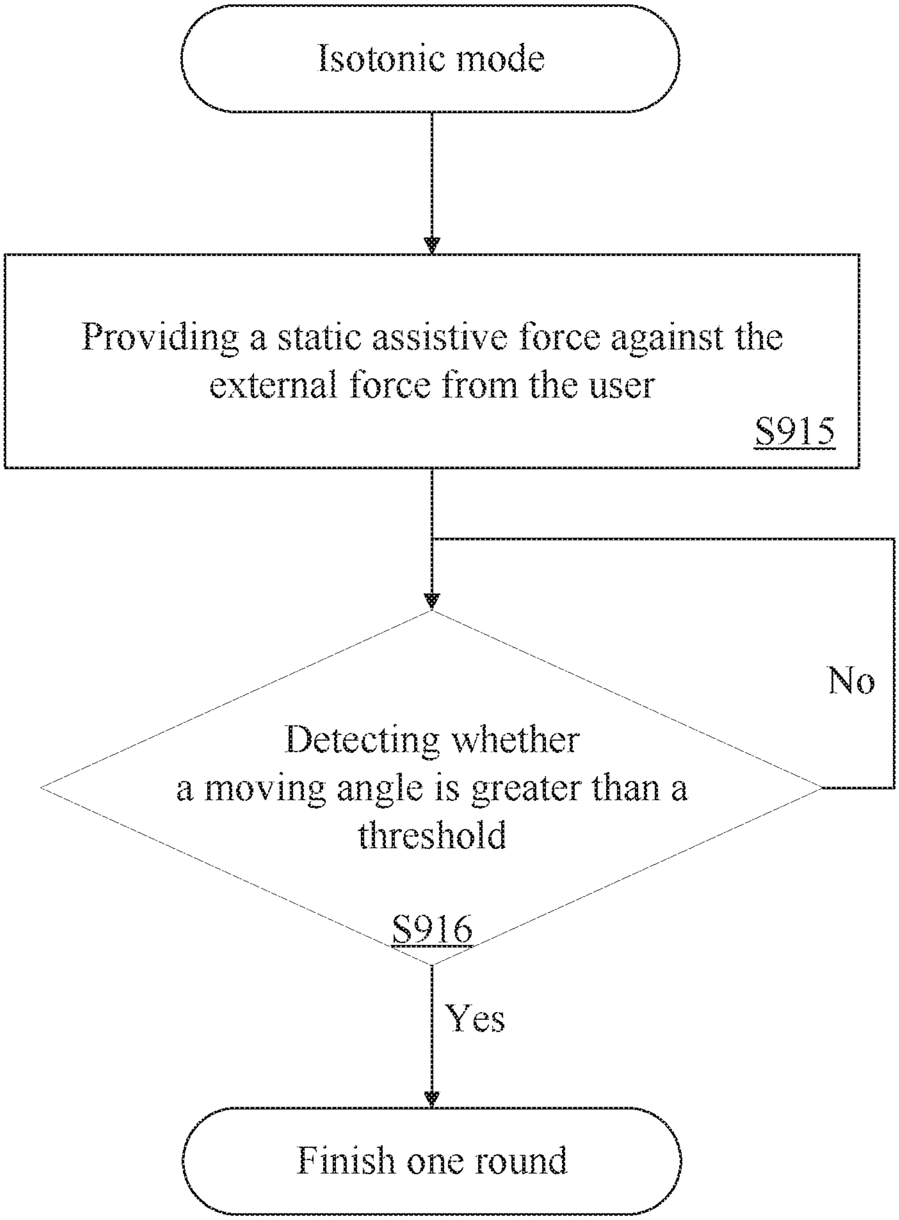
Figure 9D:
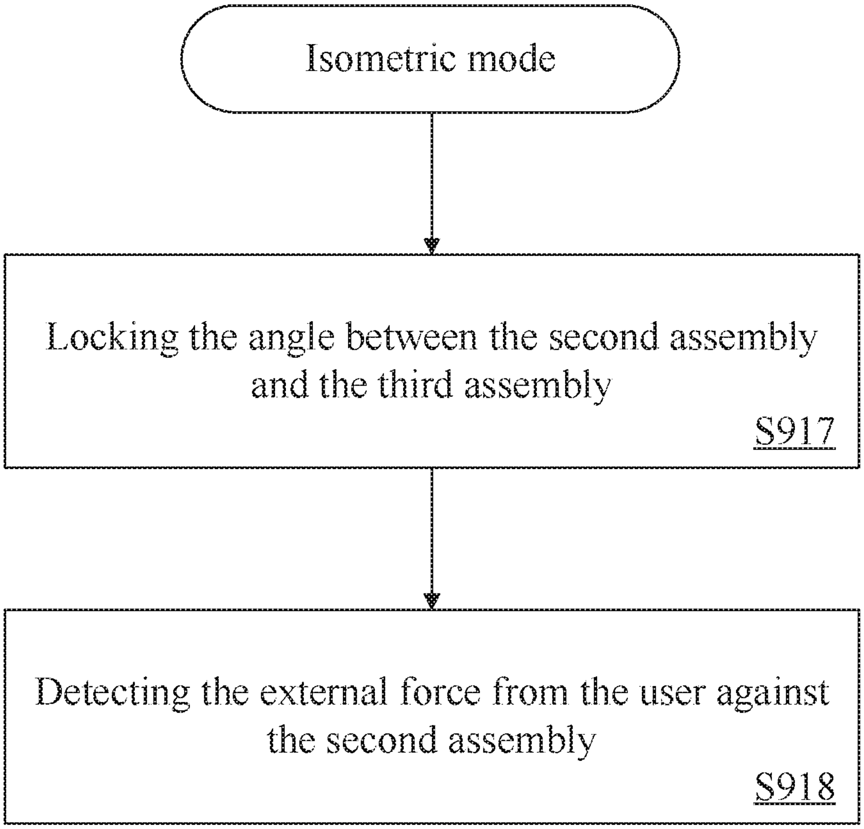

Please refer to FIGS. 8A and 8B which are flow charts of a control method for the mentioned assistive device (i.e., the assistive devices mentioned in the above embodiments). Detailed operations of the control method are as follows.

In some embodiments, the assistive device may be attached to a user. Operation S811 is executed to detect, by the driving unit of the third assembly, an external force from the user. Operation S812 is executed to amplify, by the MCU of the assistive device, the external force into an assistive force by a gain. Operation S813 is executed to control, the MCU of the assistive device, the driving unit of the third assembly to provide the assistive force for moving the second assembly.

In some embodiments, the assistive force may include a torque force. Therefore, the driving unit may provide torque force for rotating the second assembly. Accordingly, because the second assembly is fixed to the user's shank, the control method may assist the user with rotating the shank.

In some embodiments, the MCU of the assistive device may control the driving unit of the third assembly to provide the torque force for rotating the second assembly within an angle range. In other words, the user's shank may be rotated within the angle range.

In some embodiments, a configured angle may be introduced for setting a limitation of angle between the second assembly and the third assembly. When the angle between the second assembly and the third assembly reaches the configured angle during the operations, the rotation between the second assembly and the third assembly may be stopped to prevent the user from injury.

In detail, operation S814 is executed to determine, by the MCU of the assistive device, whether an angle between the second assembly and the third assembly is equal to the configured angle (e.g., zero). When the angle between the second assembly and the third assembly is not equal to the configured angle, operation S814 is repeated. When the angle between the second assembly and the third assembly is equal to the configured angle, operation S815 is executed to control, by the MCU of the assistive device, the driving unit of the third assembly to stop providing the torque force.

In some embodiments, a disturbance observer-based motion control may be used in the control method for controlling assistive power of the driving unit. In particular, when the intention of user, i.e. the external force, is detected, the driving unit may provide the torque force under a programmed profile. Assistive levels of the torque force may be adjusted by some button set of the controller.

In some embodiments, the control method may be used for aiding the user to walk. In detail, the user may set the gain, the angle range and the configured angle for the assistive device first. Then, the control method of operation S811 to S815 may be executed by the assistive device for aiding the user to walk.

In some implementations, the assistive force generated by the assistive device may be proportional to the gain. The angle range may be associated with a gait height. The configured angle may be zero.

In some embodiments, the control method may be used for aiding the user to lift legs for up-stair. In detail, the user may reset the assistive device and keep static for the assistive device to start the assistance.

Then, the assistive device may detect external force. If no external force is detected, the assistive device may repeat the detection of external force. If external force from the user is detected, then the assistive device may start to enable the assistive device with the gain and the configured angle, and then the control method of operation S811 to S815 may be executed by the assistive device for aiding the user to legs for up-stair. In these embodiments, value of the gain may be zero and the configured angle may be zero.

In some embodiments, the control method may be used for aiding the user to lift legs for down-stair. In detail, the user may set the gain, the angle range and the configured angle for the assistive device first. In these embodiments, value of the gain may be greater than zero and the configured angle may be zero.

Then the control method of operation S811 to S815 may be executed by the assistive device for aiding the user to legs for down-stair. The assistive device may further detect whether the angle between the second assembly and the third assembly is within the angle range.

If the angle between the second assembly and the third assembly is detected within the angle range, then the assistive device may repeat the detection of the angle between the second assembly and the third assembly. If the angle between the second assembly and the third assembly is detected without the angle range, then the assistive device may detect whether the external force is greater than zero.

If the external three is detected greater than zero, then the assistive device may repeat the detection of external force. If the external force is detected not greater than zero, then the assistive device may set the value of the gain as zero.

Please refer to FIGS. 9A to 9D which are flow charts of a control method for the mentioned assistive device (i.e., the assistive devices mentioned in the above embodiments). Detailed operations of the control method are as follows.

Operation S911 is executed to configure, by the MCU of the assistive, the driving unit of the assistive device to be operated under a training mode. In some implementations, the training mode includes an isokinetic mode, an isotonic mode or an isometric mode.

When the training mode is configured as the isokinetic mode, operation S912 is executed to determine, by the MCU of the assistive device, whether a rotation speed of the second assembly is greater than a threshold. When the rotation speed of the second assembly is determined not greater than the threshold, operation S912 is repeated.

When the rotation speed of the second assembly is determined greater than the threshold, operation S913 is executed to provide, by the driving unit of the third assembly, a dynamic assistive force against an external three from the user for keeping the rotation speed as the threshold.

Operation S914 is executed to detect, by the driving unit of the assistive device, whether a moving angle is greater than another threshold. When the moving angle is determined not greater than the threshold, operation S914 is repeated. When the moving angle is determined greater than the threshold, one round of the isokinetic mode training finishes.

When the training mode is configured as the isotonic mode, operation S915 is executed to provide, by the driving unit of the third assembly, a static assistive force against the external force from the user. Operation S916 is executed to detect, by the driving unit of the assistive device, whether a moving angle is greater than another threshold. When the moving angle is determined not greater than the threshold, operation S916 is repeated. When the moving angle is determined greater than the threshold, one round of the isotonic mode training finishes.

When the training mode is configured as the isometric mode, operation S917 is executed to lock, by the driving unit of the assistive device, the angle between the second assembly and the third assembly. Operation S918 is executed to detect, by the driving unit of the assistive device, the external force from the user against the second assembly.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An assistive device, comprising:

a first assembly, including:

a body used against a user and having a plate shape for the user to sit on;

a plug set; and a connecting element having a plurality of holes for receiving the plug set;

a second assembly for fixing the assistive device to shank of user, comprising:

a body;

a slot; and a brace comprising:

a fastener having a penetration hole for receiving the body of the second assembly; and a lever with a cam against the body of the second assembly to fix the brace on the body of the second assembly; and a third assembly for connecting the connecting element of the first assembly and the second assembly, and for powering the second assembly, comprising:

a rotating module having a clip module comprising a receiving space for receiving the body of the second assembly, wherein the clip module is for clipping the slot of the body of the second assembly to connect the third assembly with the second assembly;

wherein a distance between the first assembly and the third assembly is adjustable by inserting the plug set in different holes.

2. The assistive device of claim 1, wherein the plug set includes two plugs.

3. The assistive device of claim 1, wherein the body of the second assembly is configured to be extended from a lateral shank of the user to a front shank of the user.

4. A control method for the assistive device of claim 1, comprising:

configuring, by a micro controller unit (MCU) of the assistive device, a driving unit of the assistive device to be operated under a training mode;

wherein the training mode includes an isokinetic mode, an isotonic mode or an isometric mode.

5. The control method of claim 4, wherein the training mode include the isokinetic mode, and the control method further comprises:

determining, by the MCU of the assistive device, whether a rotation speed of the second assembly is greater than a threshold;

providing, by the driving unit of the third assembly, a dynamic assistive force against an external force for keeping the rotation speed as the threshold when the rotation speed of the second assembly is greater than the threshold.

6. The control method of claim 4, wherein the training mode include the isotonic mode, and the control method further comprises:

providing, by the driving unit of the third assembly, a static assistive force against an external force.

7. The control method of claim 4, wherein the training mode include the isometric mode, and the control method further comprises:

locking, by the driving unit of the assistive device, an angle between the second assembly and the third assembly; and detecting, by the driving unit of the assistive device, an external force against the second assembly.

* * * * *